United States Patent [19]

Corwin et al.

[11] Patent Number: 5,276,632
[45] Date of Patent: Jan. 4, 1994

[54] METHOD AND APPARATUS FOR IMPROVED VISUAL DISPLAY OF A TARGET VIEWED BY AN IMAGING SENSOR DEVICE

[75] Inventors: Thomas L. Corwin, McLean; Henry R. Richardson, Alexandria; Stanley D. Kuo; Tom A. Stefanick, both of Arlington; R. Norris Keeler, McLean, all of Va.; Kent Pflibsen; Lonnie K. Calmes, both of Tucson, Ariz.

[73] Assignee: Kaman Aerospace Corporation, Colorado Springs, Colo.

[21] Appl. No.: 565,480

[22] Filed: Aug. 10, 1990

[51] Int. Cl.⁵ .............................. G06G 7/48
[52] U.S. Cl. ................................... 364/578
[58] Field of Search .............. 364/570, 578; 358/95; 356/5

[56] References Cited

U.S. PATENT DOCUMENTS

| | | |
|---|---|---|
| 3,947,833 | 3/1976 | Eckstein, Jr. |
| 4,397,549 | 8/1983 | Morgan ................................ 356/5 |
| 4,497,065 | 1/1985 | Tisdale et al. |
| 4,550,435 | 10/1985 | Hayman |
| 4,736,439 | 4/1988 | May |
| 4,739,401 | 4/1988 | Sacks et al. |
| 4,845,500 | 7/1989 | Cornett et al. |
| 4,862,257 | 8/1989 | Ulich ................................ 358/95 |
| 4,920,412 | 4/1990 | Gerdt et al. |
| 4,964,721 | 10/1990 | Ulich et al. ...................... 358/95 |
| 4,967,270 | 10/1990 | Ulich et al. ...................... 358/95 |
| 4,970,660 | 11/1990 | Marchant |
| 5,006,721 | 4/1991 | Cameron et al. ................. 356/5 |

Primary Examiner—Salvatore Cangialosi
Attorney, Agent, or Firm—Fishman, Dionne & Cantor

[57] ABSTRACT

A novel data processing technique is provided for employing a physical model as an element in a process for automatic target detection of a target viewed by an imaging lidar system. The present invention obtains estimates for the mean and variance of the probability distributions for random video levels which are output from a camera. These estimates are obtained under various assumptions about the state of the target.

13 Claims, 12 Drawing Sheets

Microfiche Appendix Included
(16 Microfiche, 1/49 Pages)

METHOD AND APPARATUS FOR IMPROVED VISUAL DISPLAY OF A TARGET VIEWED BY AN IMAGING SENSOR DEVICE

CROSS REFERENCE TO MICROFICE APPENDIX:

A microfice appendix of 1 page having a total of 49 frames is appended hereto.

CROSS-REFERENCE TO RELATED APPLICATION

This application is related to:

(1) U.S. application Ser. No. 565,424 filed contemporaneously herewith entitled "Process for Automatically Detecting and Locating a Target from a Plurality of Two Dimensional Images", invented by Bobby Lee Ulich and John W. Montgomery.

(2) U.S. application Ser. No. 565,425 filed contemporaneously herewith entitled "Automatic Target Detection Process" and invented by Thomas L. Corwin, Henry R. Richardson, Stanley D. Kuo, Tom A. Stefanick, R. Norris Keeler, Kent Pflibsen, Lonnie Calmes, F. Gregory Close and Michael V. Finn.

BACKGROUND OF THE INVENTION

This invention relates generally to a process for detecting and locating a target in a series of images generated by an imaging sensor. More particularly, this invention relates to a novel process for the automatic detection and identification of targets through the use of computer image processing of data collected by an imaging sensor. This invention also relates to a novel process for obtaining parameter estimates by use of a model with the parameter estimates being used in the automatic target detection process. This invention is particularly useful in the detection of underwater targets from an airborne platform.

Various imaging sensors are used to search areas (or volumes) for particular types of targets which may pose a threat. Examples of such targets include mines and submarines in the ocean, fixed-wing and rotary-wing aircraft, cruise missiles, and rockets in the air, and buried land mines under the soil. Such imaging sensors provide target images in two dimensions. Images in two dimensions can be made either using passive radiation or using active illumination at wavelengths ranging from microwaves, millimeter waves, infrared, and invisible to ultraviolet. These two dimensional images display signal intensity and its variation in two spatial dimensions. Gated cameras used to detect signal returns from pulsed sources (imaging radars or visible lidars) can resolve range from the sensor and therefore can spatially sample a volume in three dimensions. Potential targets within this search volume produce characteristic signatures in the series of images. Examples of imaging sensors exhibiting such target images include, for example, the imaging lidar systems described in U.S. Pat. No. 4,862,257 and U.S. application Ser. No. 420,247 filed Oct. 12, 1989 (now U.S. Pat. No. 5,013,917). Both of which are assigned to the assignee hereof and incorporated herein by reference.

Imaging sensors of the general type described hereinabove typically have a display screen for viewing the detected images (e.g., targets). While a human operator viewing a display screen may provide a highly sensitive and reliable means of detecting targets, in some cases computer image processing will be superior. This is because the computer does not suffer from fatigue and inattentiveness as will be the case for human operators, especially in the environment of an aircraft such as a helicopter where noise, heat and vibration can distract from constant surveillance of the sensor display screen. Also, with multiple camera sensors, the visual data rate may be too high for a human to absorb and process effectively. Finally, the inherent complexity of spatial correlations and target signature correlations between images made at different times will require computer processing. For example, the use of a laser sensor to produce data for detection, classification and localization of underwater objects typically produces a large volume of physical measurements which must be scanned manually or automatically to determine the presence of a target. Not only is a large volume of data (approximately $10^7$ bits) produced during each scan or glimpse of the laser, but due to the desire to collect such data from a moving platform over large ocean areas, such volumes are produced at high frequence (about every 50 milliseconds). Such a data flow cannot typically be handled by a human being, even augmented with decision aids, but rather requires computer based automatic target recognition algorithms, Hence, there is a perceived need for computerized data processing techniques which will automatically (i.e., without human operator assistance) detect and locate preselected targets, particularly targets submerged underwater.

SUMMARY OF THE INVENTION

In accordance with the present invention, a novel data processing technique is provided for detecting, locating and identifying targets from a plurality of images generated by an imaging sensor such as an imaging lidar system. The present invention employs physical models of signals produced by target objects of interest. Such a model based detection system globally processes frames of data to determine the existence and location of component elements that characterize the target being modeled.

The data stream presented to the detection algorithm is an array of real numbers representing, for example, the number of electrons swept off a camera (CCD array) and passed through an amplifier. Each pixel element in a two dimensional CCD array receives photons which have traveled from a specific portion of the field of view. If multiple CCD cameras are used, the third dimension of the data array indexes the discrete set of distances particular photons have traveled from the laser pulse; each of the cameras providing a two dimensional array of electron counts from its own CCD array.

A set of feasible "hypotheses" is set forth for the state of a possible target. For example, these hypotheses could be of the form, "The target will appear in pixel (30,80) of the camera trained at depth gate 2," or, "There is no target present in the current field of view." The choices of hypotheses reflects the entire range of potential target states. Assuming that one of these hypotheses is true, a physical model then provides a probability distribution of the number of electrons in the three-dimensional data array. This model accounts for all environmental conditions, optical parameters, and the orientation and location of the cameras. A physical model which measures small numbers of electrons is by nature a probabilistic one due to quantum mechanical considerations. Because of this, one can not say exactly how many electrons will be produced even if one knew the true state of the target.

Each of the probability distributions is approximately normal (bell-shaped), and hence can be described by its mean, which measures the midpoint, and its standard deviation, which measures the spread of the distribution. The variance is the square of the standard deviation and is of use because it arises more often than standard deviation in subsequent formulae. For each hypothesis and each pixel then, the physical-optical model furnishes two numbers-a mean and variance. These numbers are denoted as $\mu_n0$, $\sigma^2_n0$ for the mean and variance in pixel 'n' when no target is present, and by $\mu_{n,m}A$, $\sigma^2_{n,m}A$ for the mean and variance in pixel 'n' when the target is in the state of hypothesis 'm'. In practice, these numbers may either be computed between pulses of the laser or else computed prior to the run and only recalled between pulses. These numbers are arranged in a data array.

The above discussed data array is then introduced into the probability model. Let $Z_n$ be the number of electrons observed in pixel 'n', so that the set $\{Z_n\}$ is the three dimensional array of data from a single pulse of the laser. Statistical detection theory provides a means of determining which of the many hypotheses is most likely to have produced the data $\{Z_n\}$. The measure used is the likelihood ratio which is a set of real numbers, one for each of the hypotheses on target state relative to the hypothesis that the target is not present. The log of the likelihood is given by the formula $$llr_m \sum_{n \in I(m)} \left[ \frac{(Z_n - \mu^A_{n,m})^2}{\sigma^2_{A,m}} - \frac{(Z_n - \mu_n^0)^2}{\sigma^2_n0} + \ln(\sigma^A_{n,m}/\sigma_n^0) \right] \quad (1)$$

where
$$I(m) = \{n \mid \mu_{n,m}A \neq \mu_n^0 \text{ or } \sigma^2_{n,m}A \neq \sigma^2_n^0\} \quad (2)$$

and the $\mu$'s and $\sigma$'s are as defined above. The likelihood ratio for hypothesis 'm' will be large precisely when the data is consistent with the physical-optical model predications for the data and is inconsistent with the predicted behavior under the hypothesis that "No target is present." The set $I(m)$ is the set of pixels where these two predictions differ between hypothesis 'm' and the no target hypothesis. The above expression is an exact formula for the optimal log likelihood ratio statistic. Another statistic is available which is not so computationally intensive. It uses the function $$llr_m \sum_{n \in I(m)} \left\{ \frac{Z_n(\mu^A_{n,m} - \mu_n^0)}{\sigma^2_n0} - \frac{1}{2} \frac{[(\mu^A_{n,m})^2 - (\mu_n^0)^2]}{\sigma^2_n0} \right\}, \quad (3)$$

which is similar to the above formula, except the differences between $\sigma^2_n^0$ and $\sigma^2_{n,m}A$ have been ignored in order to shorten the computations. The first of these two theories is called the "quadratic theory" and the second theory, with the approximation described, is the "linear theory."

The computations performed by the computer then are to evaluate the above sums for all of the possible hypotheses and store them. A "prior probability distribution" is used to weight the hypotheses in such a way that reflects any prior information about target state. The likelihood ratios are multiplied by the prior probability. For each of the theories individually, the maximum of these products is found. If that maximum is larger than a threshold value, then the algorithm states that a target has been detected. Its state is given by the hypothesis that is actually responsible for the maximum value. If none of the products is above the threshold, then the algorithm declares that the data is most likely explained by the absence of any target in the field of view.

The threshold provides a means to trade off between missed detections and false alarms; it is a measure of how consistent the data must be with a certain hypothesis before it is chosen. If the threshold is high, then very often the algorithm will signal "no target". On the other hand, if the threshold is low then the algorithm will quite often say that a target is present, but may be "fooled" by spurious statistical fluctuations.

In summary, the actual computations performed in the computer to actually implement the above algorithm are described:

(1) Important physical constants are read in. These include information about the airborne platform's state, the illuminator, the prevailing environmental conditions, as well as the characteristics of the optics, including the setting of the gain control.

(2) Given the above information, for each hypothesis, the distribution of the number of electrons on the CCD array is calculated for each pixel. This is the computer implementation of the physical-optical model to produce the values of $\mu_n^0$, $\sigma^2_n^0$, $\mu_{n,m}A$ and $\sigma^2_{n,m}A$.

(3) The three dimensional data array is read in.

(4) Using formulas (1) and (3) above, likelihood ratios are calculated for each of the hypotheses under the linear and quadratic model.

(5) For each theory, the likelihood ratio of every hypothesis is multiplied by the prior probability of the hypothesis. The maximum of the products is determined.

(6) This maximum is compared to a threshold level.

(7) If the value is larger than the threshold, then the hypothesis generating the target's likelihood ratio is chosen as the target's state, otherwise the computer signals "no target present". The predictions of the quadratic and linear theories may be different in some cases.

The present invention also includes a process for employing a physical model as an element in the process of automatic target detection (ATD) described above. As discussed above, the ATD process requires estimates for the mean and variance of the probability distributions for the random video levels which are output from the camera. These estimates must be obtained under various assumptions about the state of the target.

In order to obtain these estimates, one must model the physics of radiative transfer of energy from the pulsed light source (e.g., laser) to the photocathode of the camera. The signal processing within the camera must also be modeled by a transfer function that describes how the camera inputs result in output pixel video levels.

The end results are estimates for the mean $\mu_n^0$ and the standard deviation $\sigma_n^0$ of the output video level $Z_n$ for the nth pixel when the target is not assumed present (the null hypothesis), and the mean $\mu_{n,m}A$ and the standard deviation $\sigma_{n,m}A$ of the output video level $Z_n$ for the nth pixel when the target is in the state specified by the mth alternative hypothesis. Under Gaussian assumptions, these values permit computation of the probability density functions required by the ATD algorithms.

The process for obtaining these estimates includes seven steps. These steps are as follows:

(1) Compute the mean and variance of the laser radiance function at the depth of interest for the hypothesis under consideration.

(2) Compute the mean and variance of the resulting radiance function from the tip surface of the depth stratum due to backscattering from the water volume and due to reflection or obscuration from the target if it is assumed present under the given hypothesis.

(3) Compute the mean and variance of the intensity function which is obtained from integrating the radiance function over the projected area of a pixel at the top surface of the depth stratum.

(4) Compute the mean and variance of the power which is imaged on the focal plane by integrating the intensity function over the solid angle subtended by the entrance aperture of the camera by accounting or attenuation and other transmission losses.

(5) Compute the mean and variance of the power reflected back into the camera from the sun and sky.

(6) Compute the mean and variance of the number of photons corresponding to the total energy received from and imaged on pixels on the focal plane over the time duration of the camera exposure gate width. This total energy is the sum of reflected laser energy and reflected sunlight and skylight energy.

(7) Compute the mean and variance of the digitized pixel video levels on the CCD array by use of measured camera "transfer function" (or, alternatively, by use of a model for the camera).

The present invention is particularly well suited for processing images of underwater targets generated by an imaging sensor located on an airborne platform whereby the underwater target is precisely and accurately detected, located and identified.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several Figures.

DESCRIPTION OF THE PREFERRED EMBODIMENT:

While not limited thereto in its utility, the image processing techniques of the present invention are particularly well suited for use in conjunction with a novel imaging lidar system disclosed in U.S. patent application Ser. No. 565,631 filed Aug. 9, 1990 entitled "Imaging Lidar System" and invented by Charles H. Kaman, Bobby L. Ulich, Robert Mayerjak and George Schafer, said application being assigned to the assignee hereof and fully incorporated herein by reference. This imaging lidar system utilizes a pair of pulsed laser transmitters for increased power and six gated camera detectors. The multiple lasers and cameras are optically boresighted to a scanning mirror for increased swath width perpendicular to the heading of the airborne platform.

Figure 8:
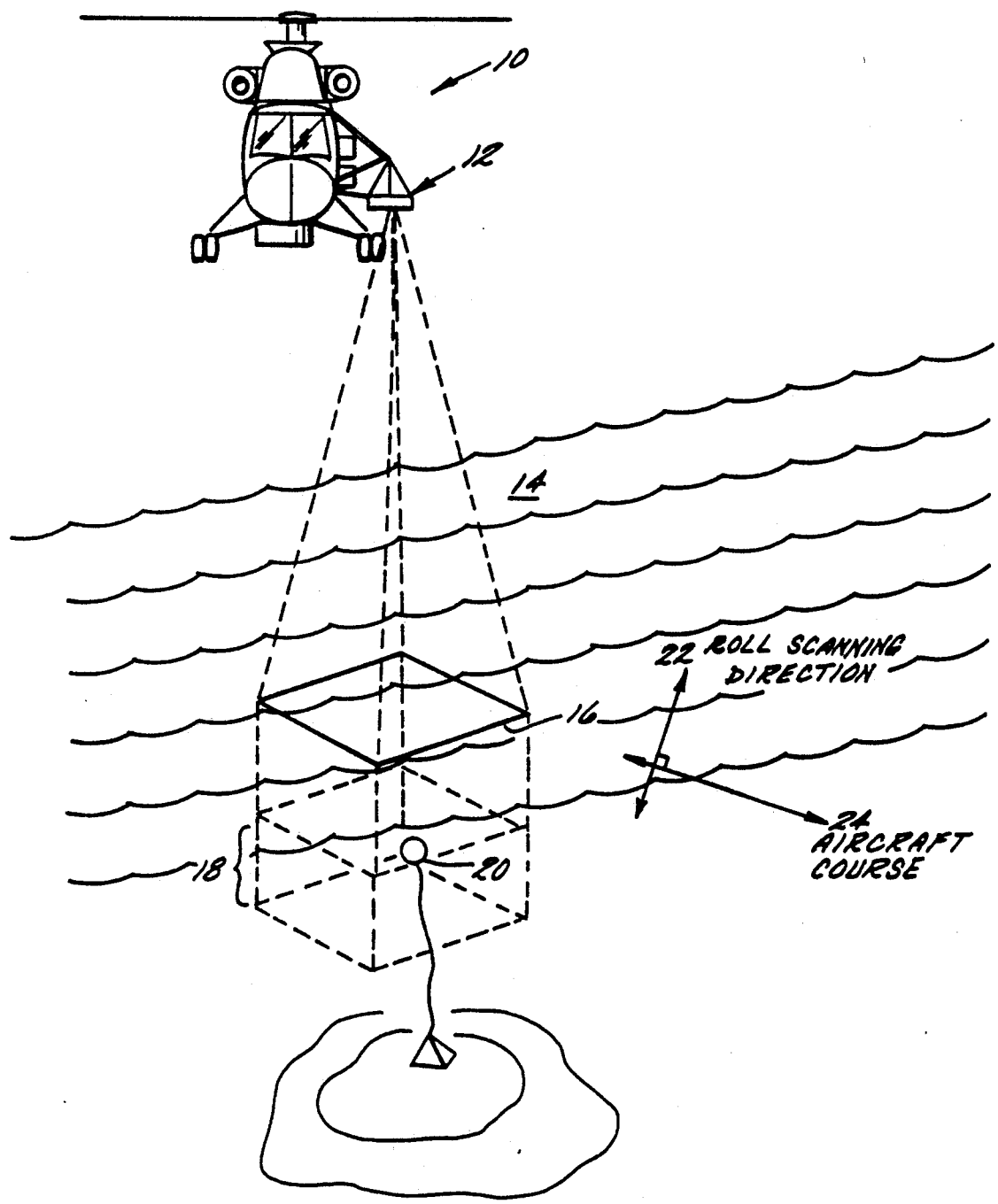
FIG. 8 is a schematic view of an imaging lidar system mounted on an airborne platform and imaging a target submerged underwater.

The imaging lidar system of U.S. Ser. No. 565,631 is shown in more detail with reference to FIGS. 8 and 9. In FIG. 8, an airborne platform such as a helicopter 10 (or fixed wing aircraft) has sensor equipment 12 of the present invention mounted so that the ocean 14 (or other body of water) below is visible from sensor 12 without obstruction. The sensor instantaneous filed of view (IFOV) is a rectangle 16 on the surface of the water. In accordance with well known operative procedures for lidar systems (described in detail in U.S. Pat. No. 4,862,257), the gating of the cameras will be delayed beyond the time the surface glint returns to sensor 12 in order to avoid undesirable clutter in images of submerged targets. The camera gating is actually delayed so that a submerged water volume 18 is imaged which may contain a target 20 such as a moored mine. The sensor IFOV may be scanned in the roll plane 22 which is perpendicular to the aircraft course 24. This side-to-side scanning is used to increase the lateral range of search and detection. Thus, the sensor has a large filed of regard or swath width as the aircraft flied along its course.

Figure 9:
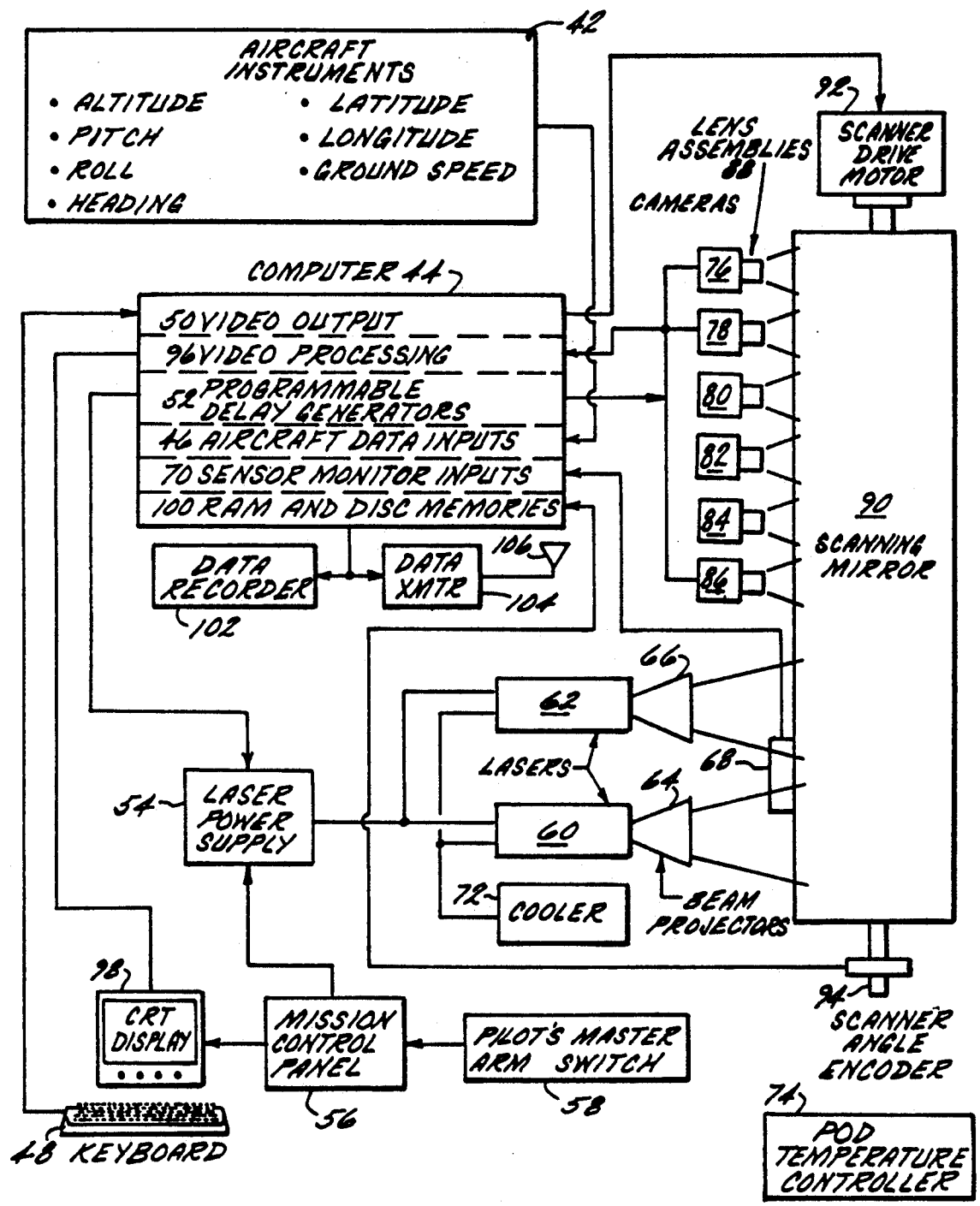
FIG. 9 is a system block diagram of an imaging lidar system for use with the present invention.

A system block diagram of imaging lidar 12 (FIG. 8) is shown in FIG. 9. Referring to FIG. 9, standard and known aircraft instruments 42 provide signals to computer 44 representing altitude, roll angle, pitch angle, compass heading angle, latitude and longitude (from a LORAN or Global Positioning System receiver), and ground speed (both forward and lateral components). Interface circuits 46 in computer 44 are used to measure the aircraft instrument data. Operator input data is provided by means such as a keyboard 48 or touch screen controller to computer 44 by means of an input interface 50. Delay generators 52 under software control are used to trigger the pulsed laser power supply 54 as described in detail in U.S. Pat. No. 4,964,721. Mission control panel 56 is used by the operator to activate the system. A pilot's master arm switch 58 is used as an interlock to enable or to disable the laser firing.

A pair of lasers 60 and 62 are driven by laser power supply 54 so that short (approximately 10 ns) pulses of visible light are generated. (It will be appreciated that the present invention may utilize only a single laser transmitter; however, multiple lasers are preferred for increased power as will be discussed in detail hereinafter). The small diameter laser beams are projected through novel beam projectors 64, 66 which convert the nonuniform intensity distribution of a typically round beam into a uniformly bright rectangular beam.

A laser light monitor 68 provides a signal to the sensor monitor input circuits 70 of computer 44 to verify proper laser operation in terms of pulse frequency, pulse width and pulse energy. A cooler 72 is used to transfer heat from lasers 60, 62 to ambient air near pod 26. A temperature controller 74 maintains temperature of the cooling fluids to allow proper operation of the internal equipment.

Figure 4:
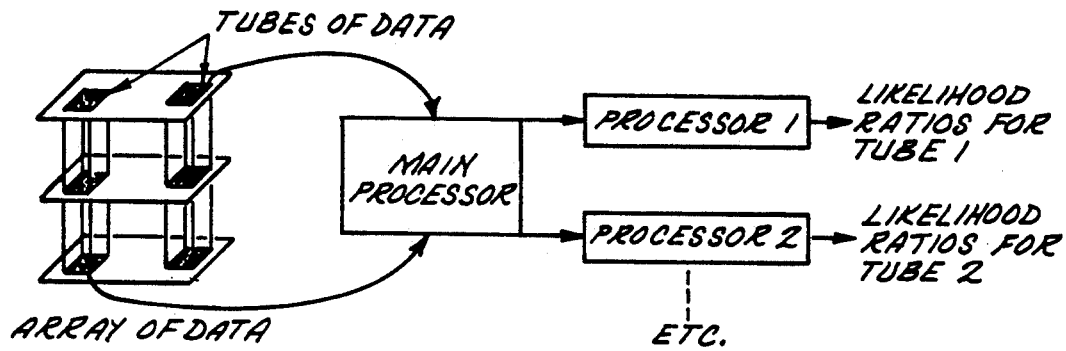
FIG. 4 is a schematic diagram depicting sample partition of data acquired by an imaging system.
Figure 5:
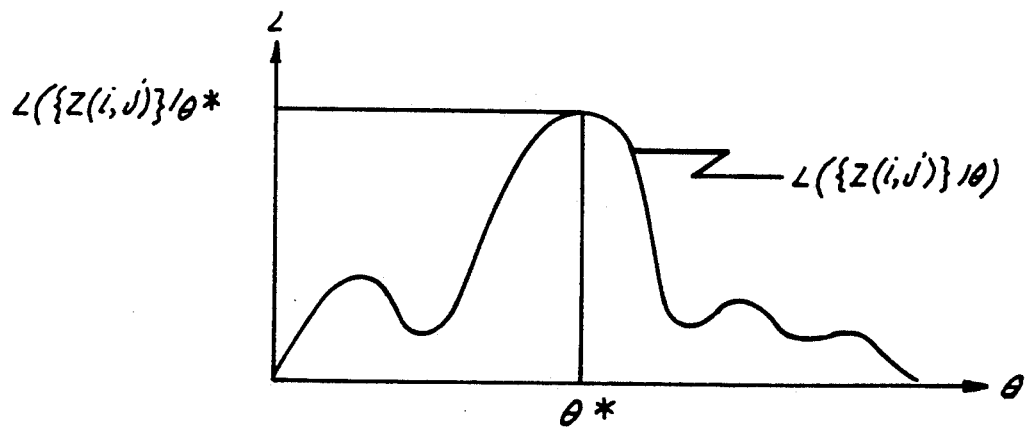
FIG. 5 is a plot of likelihood ratio statistic.

Imaging lidar system 12 also includes a plurality (preferably six) of aligned cameras 76, 78, 80, 82, 84 and 86 which comprise intensified charge coupled devices (ICCD). The ICCD's are preferably associated with electronic gating circuits (as described in U.S. Pat. No. 5,029,009, which is assigned to the assignee hereof and fully incorporated herein by reference) which allow exposure time of ten to hundreds of nanoseconds. Alternatively, the ICCD cameras may comprise the camera shown in FIG. 4 of U.S. Pat. No. 4,862,257. A lens assembly 88 is mounted on each of the multiple cameras 76–88 and comprise a multiple-element lens and a narrow spectral filter which is matched to the laser wavelength.

Each of the cameras 76–86 and the lasers 60, 62 are optically boresighted to a common line of sight toward a scanning mirror 90. Scanning mirror 90 reflects the laser beams and the camera lines of sight from a nominally horizontal direction perpendicular to the aircraft heading down toward the nadir. The axis of motion of scanning mirror 90 is parallel to the aircraft heading, and allows a scanner drive motor 92 to rotate scanning mirror 90 in the roll direction, allowing the sensor to view to the left and to the right of the nadir. A scanner angle encoder (or equivalent such as a linear encoder) 94 is used to measure the mirror angle by providing feedback to a servo control loop implemented in computer 44. The multiple video outputs of cameras 76–86 are received by a video processor 96 in computer 44 which in turn, is connected to a video display 98, thus providing a visual display of a target imaged by imaging lidar sensor 12.

The following detailed description is generally divided into two sections. The first section relates to an automatic target detection (ATD) technique for processing imaging data gathered by an imaging sensor. The imaging data is received by a camera and is imaged into an array of pixels by means of a change coupled device (CCD). The pixel voltages appearing on the CCD array are digitized and input as numerical data to the ATD processing. This automatic target detection technique utilizes estimates of the first two moments (means and variance) of the probability distribution for the digitized pixel video levels under various hypotheses concerning the target's state. The second section of this detailed description relates to a process for obtaining these parameter estimates by use of a physical model.

I. Automatic Target Detection

The high level logical flow of the automatic detection algorithm is presented as a flow chart in FIG. 1. Numbered steps will refer to the numbers affixed to FIG. 1 and the subsequent figures. Step (1) is the starting point of the detection algorithm. Step (2) initializes all of the global variables of the algorithm and allocates computer memory locations needed for the operation of the algorithm. Step (3) is the exposing of the gated cameras necessary to produce the data. The hardware for this step of the process has been described previously in the above-referenced pending application. In Step (4), parameters necessary for the physical model described in Step (5) are read in. These parameters pertain to the existing environmental conditions, the locations of the sensor, its orientation in space and certain physical constants. Table 1 contains a sample listing of relevant physical parameters for one possible physical model. In Step (6), the algorithm present in the physical model is run numerous times to compute expected numbers of photons impinging on certain parts of the lense. Specifically, for each hypothesis of target state present in the hypothesis state the expected number of photons hitting a section of the initial lense which, through elementary geometrical optics calculations, will ultimately be expected to fall in a specific picture element (pixel) of the CCD array. A hypothetical physical model is described in more detail in FIG. 2 (and in even more detail hereafter). The output of the model is an expected number of photons and the statistically defined variance in the number of photons. The statistical nature of the number of photons observed in any region is captured by the physical model.

The set of hypotheses described above is a key element in the Bayesian decision theory approach of the detection algorithm. The nature of the hypothesis space relevant for the target detection scheme under consideration is further elaborated herein. The set of hypotheses is designed to correspond to the targets which are believed to be present. For example, these hypotheses could be of the form, "The target will appear in pixel (30,80) of the camera trained at depth gate 2," or, "There is no target present in the current field of view." The choice of hypotheses will reflect the entire range of potential target states. The composition of specific hypotheses may change depending upon the geometry of the search platform during one sortie. For instance, if the platform is at a low altitude, then the targets under consideration will extend across many pixels; at higher altitudes, the target will appear in fewer pixels. The hypotheses must change to reflect the dynamic nature of the platform geometry. The shape of the expected targets will also influence the choice of hypotheses. For example, in the case of circular mines of known size, the hypotheses reflect solely the position (including depth) of the mine.

Figure 1A:
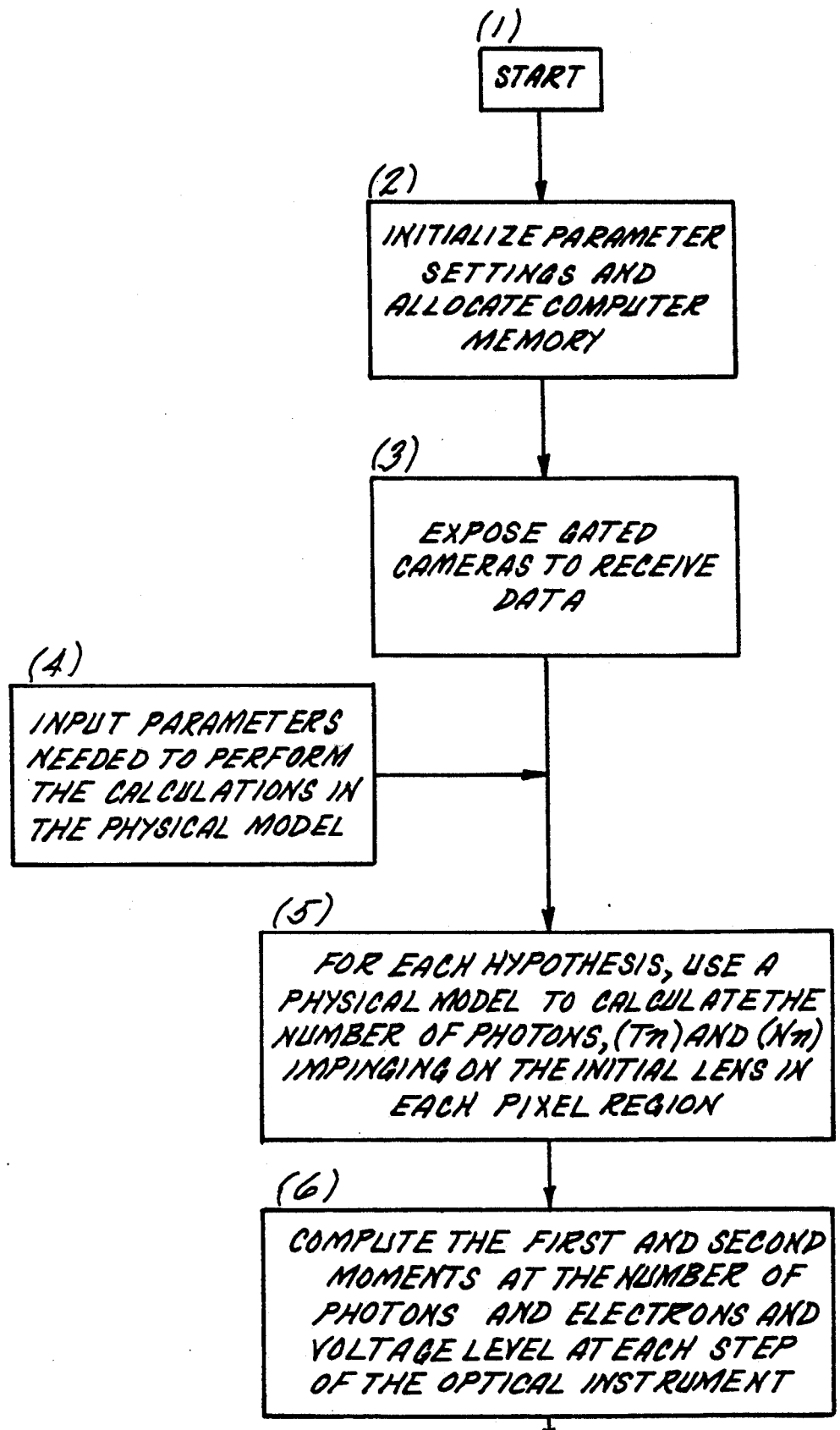
FIGS. 1A-D is a flow chart depicting the image processing technique of the present invention.
Figure 1B:
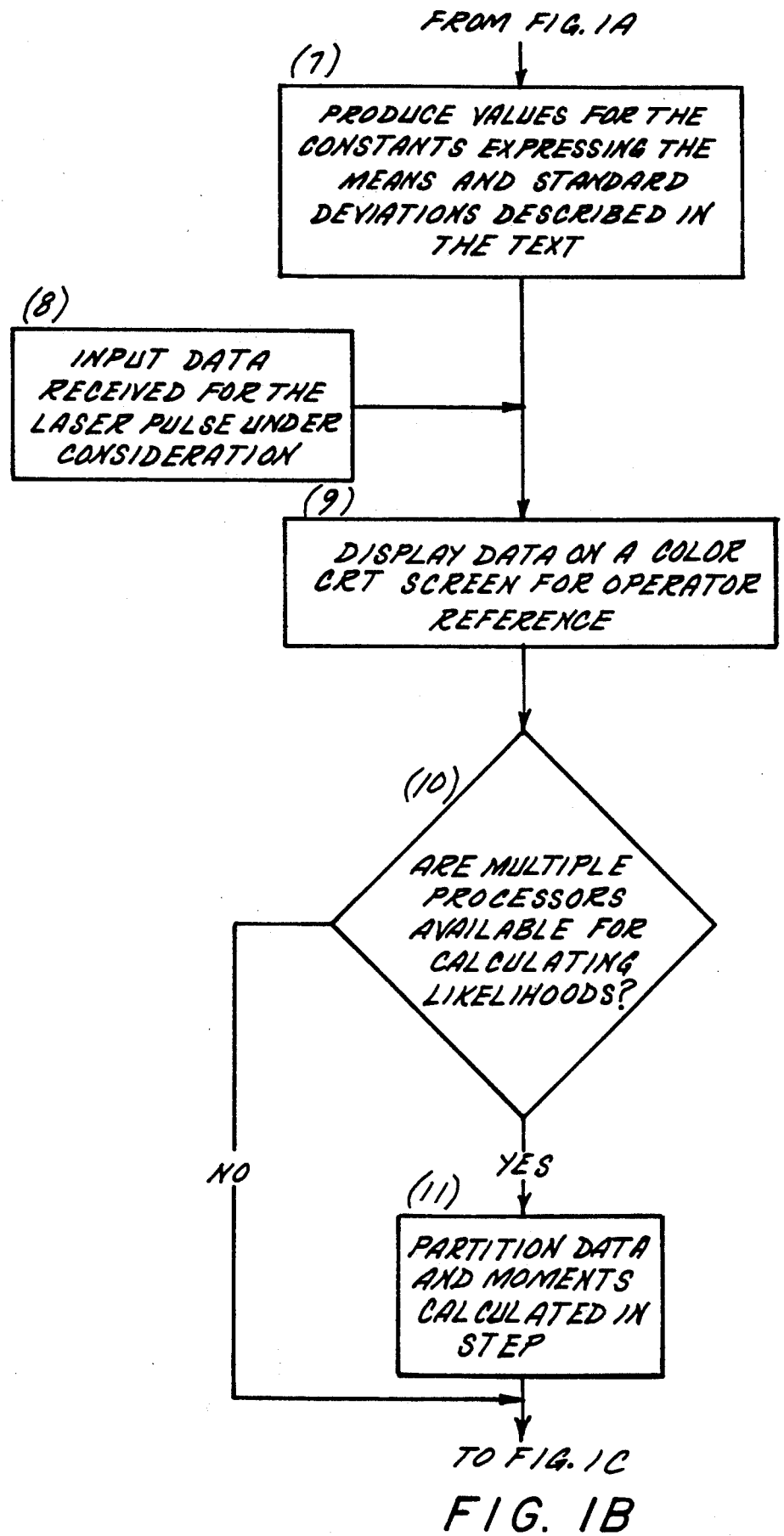
Figure 1C:
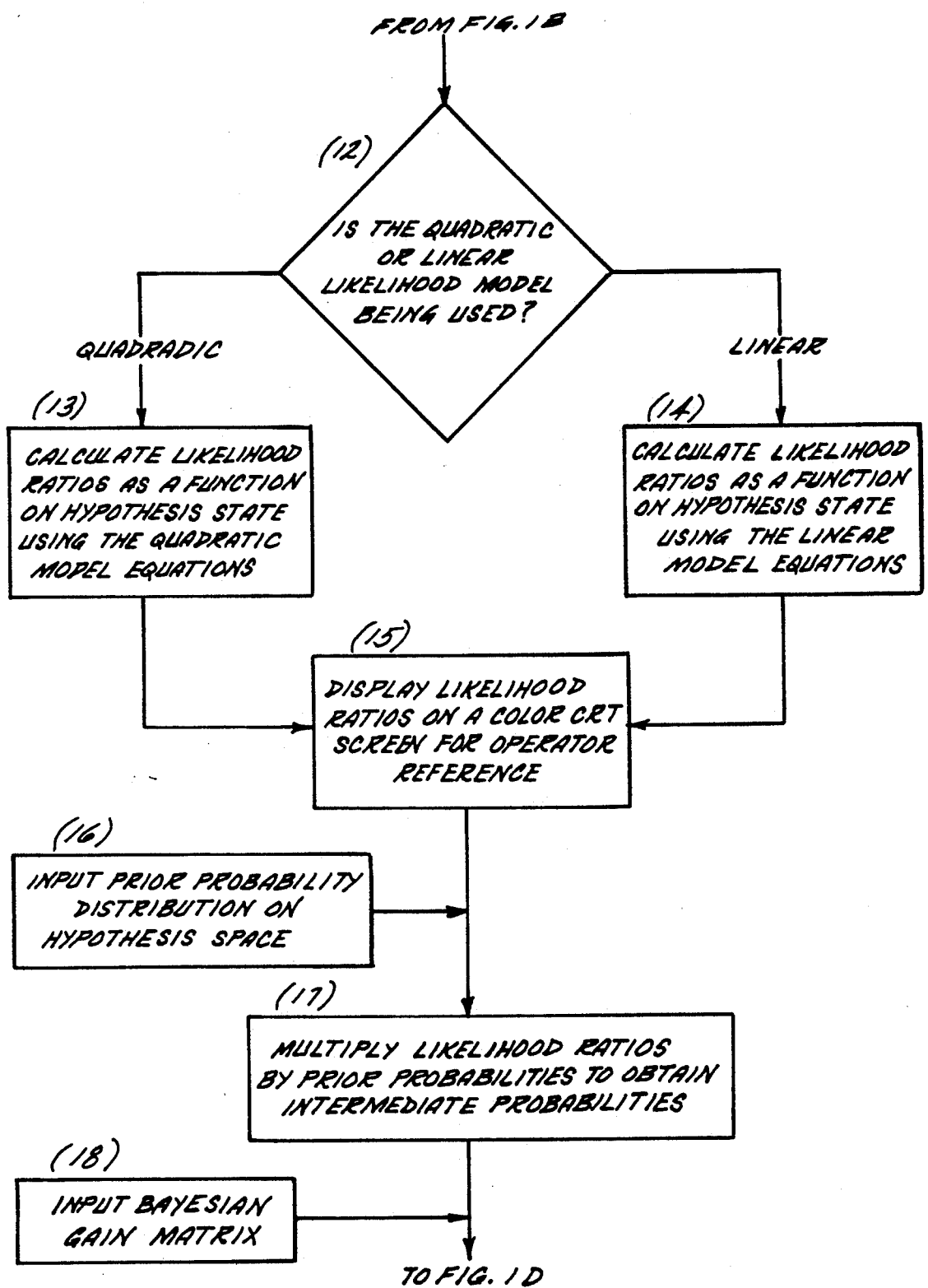
Figure 1D:
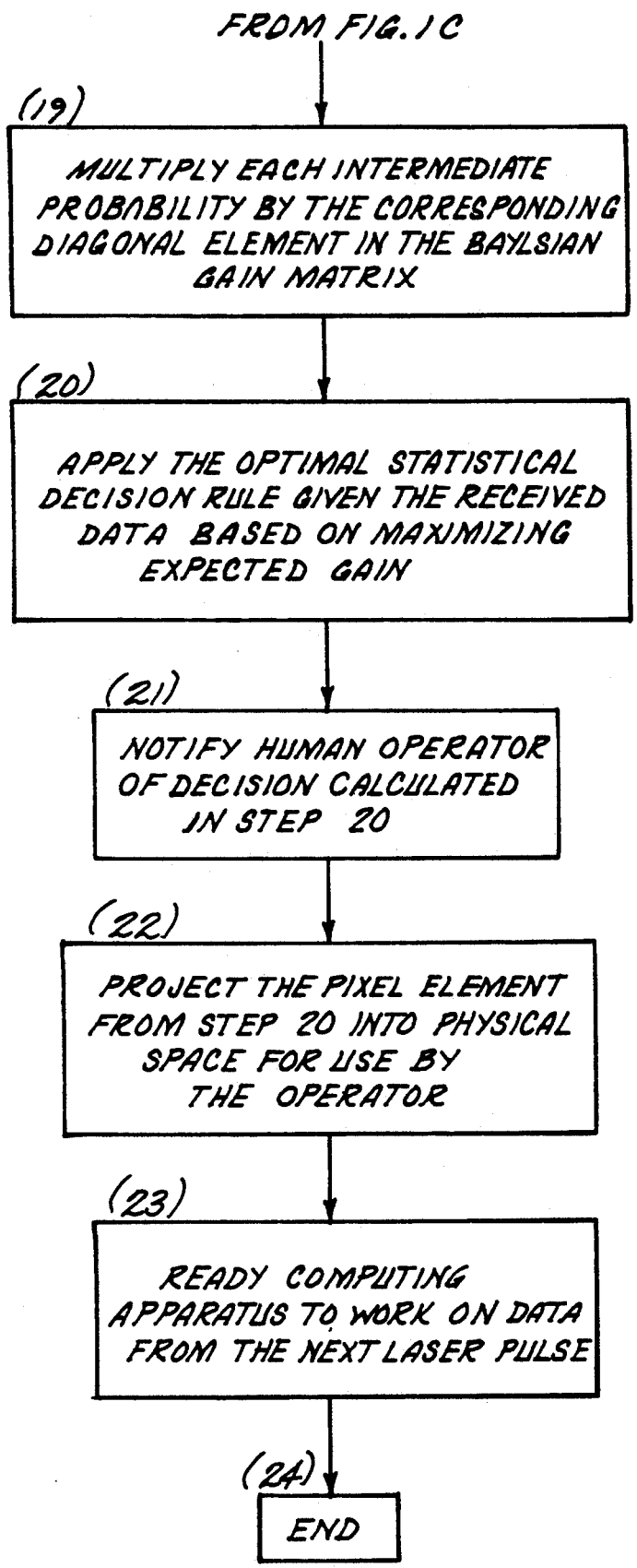
Figure 2:
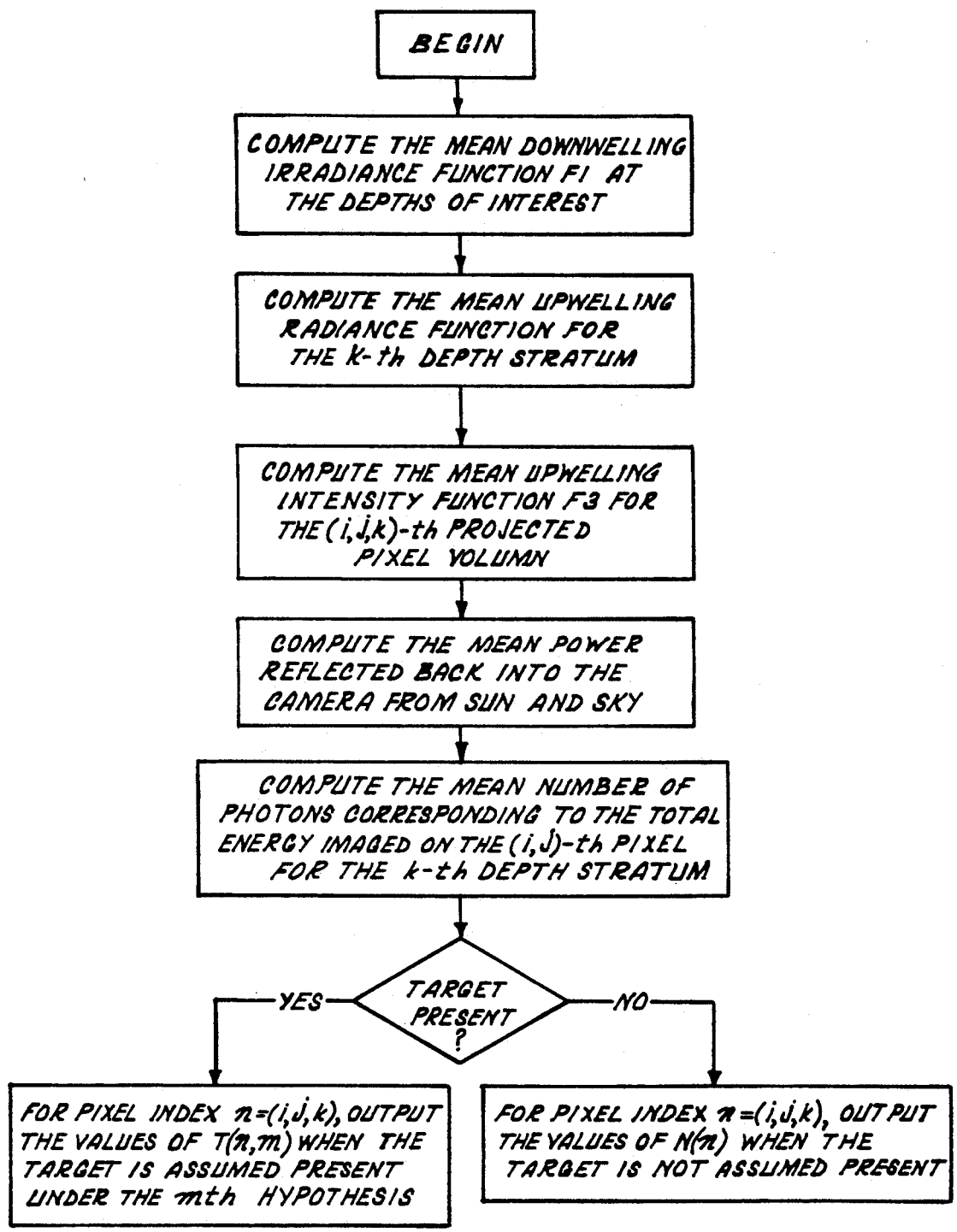
FIG. 2 is a flow chart of a physical model used in the image processing technique of the present invention.
Figure 3:
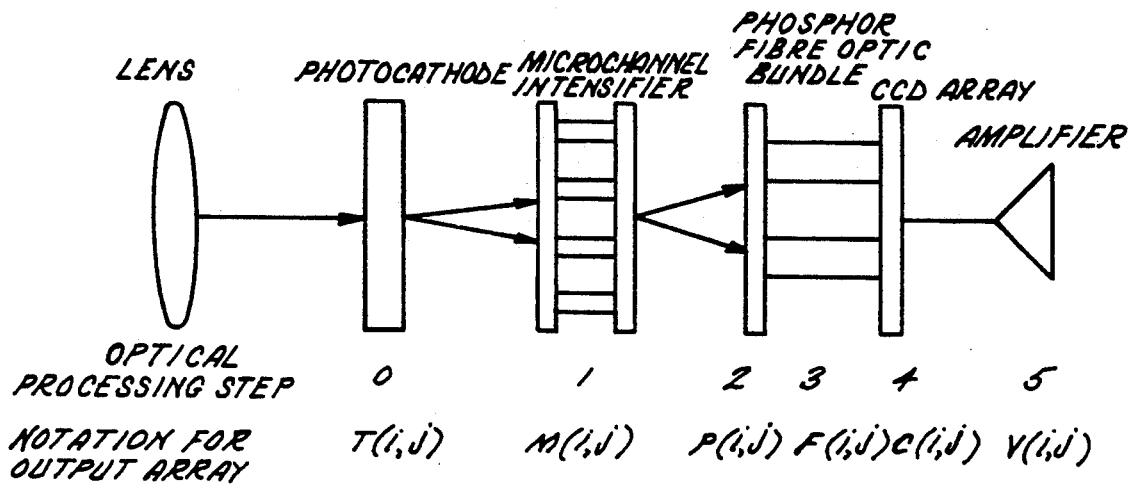
FIG. 3 is a schematic diagram of optical processing instrumentation used in conjunction with the image processing technique of the present invention.
Figure 7A:
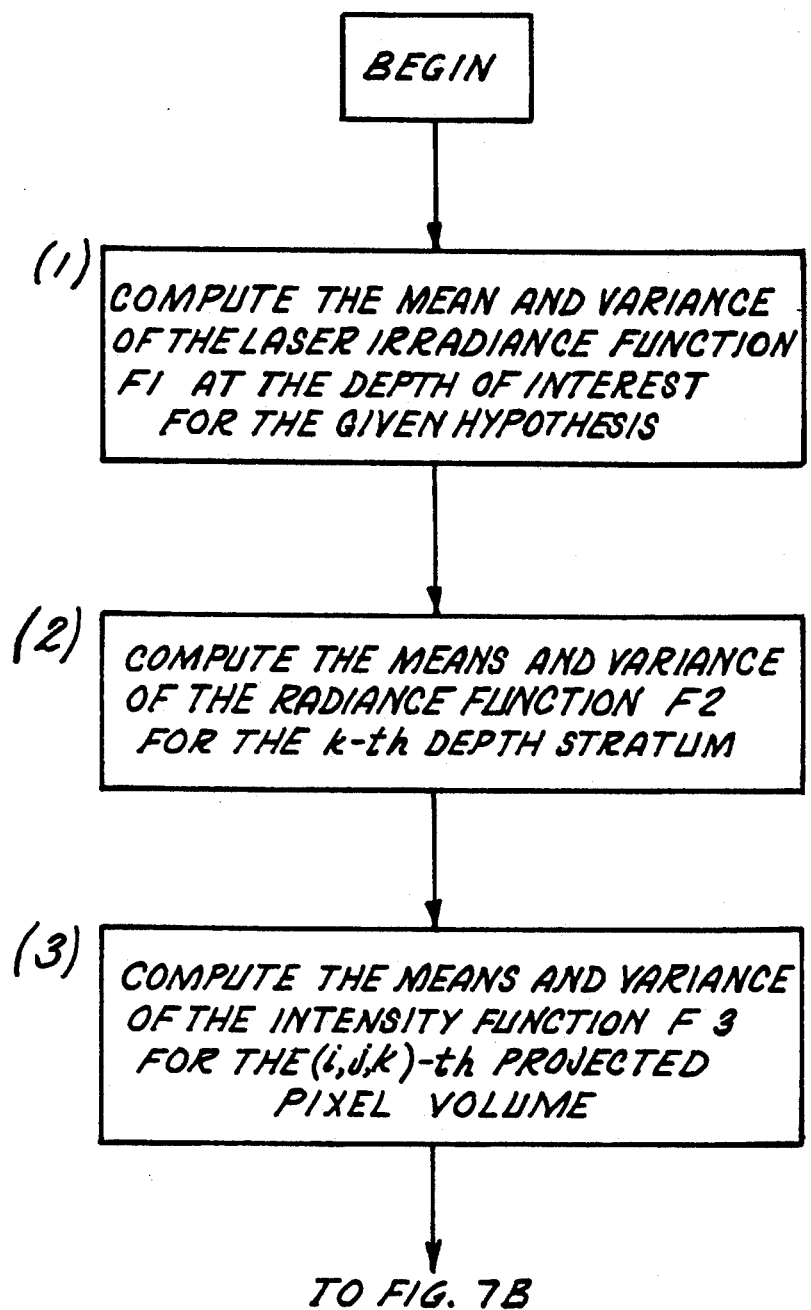
FIGS. 7A-7B is a flow chart of the physical model of FIG. 2 shown in greater detail.
Figure 7B:
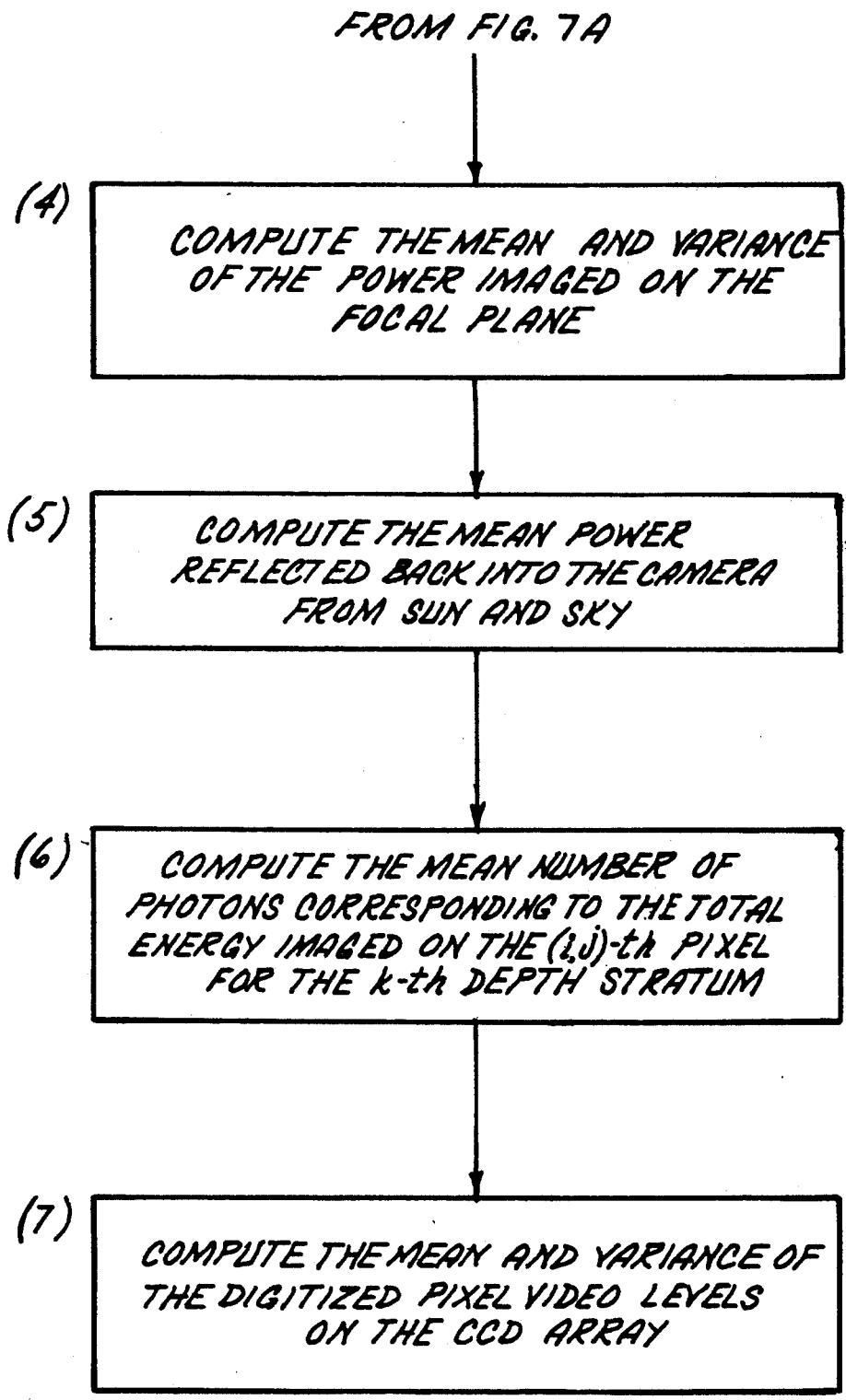

The physical model represented in FIG. 2 describes the number of photons present at the initial lense of the optical instrument. The data stream presented to the algorithm consists of numbers of electrons at the final stage of the optical instruments. Referring to FIG. 3, the physical model accounts for the number of photons at the left of the figure. The data is collected after Step (5), the Amplifier. In order to maintain a rigorous calculus of probabilities in the data, the effect of the optical instruments must be modeled. Each step of the processing may be modeled individually as represented in Tables 2 through 7, inclusive. Alternatively, the optical processing may be taken as a whole and the composite effect of the optical components may be modeled through a transfer function which can be derived either theoretically or through experiments on the optical apparatus. A preferred physical model and optical model is described hereinafter with reference to FIG. 7.

Resuming discussion of the high level flow chart, FIG. 1, Step (7) will now be discussed. We assume that the distributions of the numbers of photons is approximately normal at the end of the optical instrument. With this assumption, the distribution of the number of photons collected after the Amplifier (Step (5) in FIG. 3)

can be described by the vector of means as well as the covariance matrix of the multidimensional normal distribution. We also assume that given a particular hypothesis, the returns in one pixel are independent from the returns in another pixel, in which case the covariance matrix is devoid of nonzero terms off of the main diagonal. The multidimensional normal thus factors as a product of one dimensional normal distributions.

Each of the one dimensional normal distributions may be described by its mean and its standard deviation. For each hypothesis, and each pixel, then, the combination of the physical and optical models furnishes two numbers—a mean and variance. It will prove convenient for subsequent discussion to name certain variables; to wit, let $\mu_n^0$, $\sigma^2{}_n^0$ denote the mean and variance in pixel 'n' when no target is present, and $\mu_{n,m}^A$, $\sigma^2{}_{n,m}^A$ denote the mean and variance in pixel 'n' when the target is in the state of hypothesis 'm.' Step (7) consists of setting values for the variables $\mu_n^0$, $\sigma^2{}_n^0$, $\mu_{n,m}^A$ and $\sigma^2{}_{n,m}^A$.

Up to the present point, no use has been made of the data received in the gated cameras. Steps (1) through (7) provide a rigorous probabilistic framework for the statistical problem of target detection using the hardware described in the above-referenced patent application. In Step (8), data from the laser pulse under consideration is input to the algorithm in machine readable form. Referencing FIG. 3, the data consists of voltage levels produced by the amplifier in Step (5). Let $Z_n$ be the number of electrons observed in pixel 'n', so that the set $\{Z_n\}$ is the three dimensional array of data from a single pulse of the laser. In Step (9), the data is displayed on a CRT color screen available to the human operator for reference purposes. Real numbers are converted to colors by standard computer graphics techniques. At Step(10), a fork is present, with outgoing paths determined by whether the computer hardware present contains multiple processors. Because of the large amounts of data it is desirable to have a multi-processor computer. In the event that multiple processors are present, Step (11) is invoked. Step (11) partitions the data and variables $\mu_n^0$, $\sigma^2{}_n^0$, $\mu_{n,m}^A$ and $\sigma^2{}_{n,m}^A$ into tubes which can be passed to individual processors for subsequent steps of the algorithm. FIG. 11 demonstrates a graphical method of partitioning the data in such a way that communication between the processors in minimized in the calculation of the likelihood ratio statistic described below.

The output of any automatic detection algorithm is a decision that the target is either not present or present in one or more possible states. In the classical case of a simple hypothesis versus a simple alternative a best critical region is determined by the Neyman-Pearson theory. The likelihood ratio statistic for testing $H_0$ against $H_\theta$, can then be formally written as $$L(\{Z(i,j)\}|\theta) = \frac{F(\{Z(i,j)\}|H_\theta)}{F(\{Z(i,j)\}|H_0)}$$

where $F(\{Z(i,j)\}|H)$ is the Radon-Nikodym derivative of the probability measure of $\{Z(i,j)\}$ given H with respect to a suitably chosen basis measure on the class of functions containing $\{Z(i,j)\}$.

Thus, given a sample $\{Z(i,j)\}$ one computes the likelihood ratio statistic as a function of $\theta$. The space of values of $\theta$ is the set of all parameter values upon which the structure of the signal is likely to depend. Questions of both signal detectability and the localization potential of a detection may be understood through the dependence of the likelihood ratio statistic on $\theta$.

Detection Statistics a. Classical Neyman-Pearson hypothesis testing theory provides that the optimal statistic for maximizing probability of detection for a given level of false alarm probability is given by $L(\{Z(i,j)\}|\theta^*)$. $\theta^*$ is the value of $\theta$ which maximizes $L(\{Z(i,j)\})$.

b. Bayes hypothesis testing theory provides that the optimal statistic for maximizing probability of detection for a given level of false alarm probability when prior probability density $g(\theta)$ is available is $$L(\theta) = \int g(\theta) L(\{Z(i,j)\}|\theta) \, d\theta.$$

Localization Statistics a. The maximum likelihood estimate for $\theta$ is given by $\theta^*$, the value of $\theta$ which maximizes $l(\{Z(i,j)\}|\cdot)$. ($\theta^*$ is not necessarily unique.)

b. The Bayes estimator for $\theta$ is given by $$\theta = \frac{\int \theta g(\theta) L(\{Z(i,j)\}|\theta) d\theta}{L(\theta)}.$$

Step (12) in FIG. 1 represents a decision as to whether the Linear or Quadratic model is to be used. Both models are applications of optimal decision theory logic to the detection problem at hand through the use of likelihood ratio statistics. The difference between the two is that the Quadratic model calculates the necessary likelihood ratio statistics using the full probability model described above; the Linear model on the other hand, assumes that the variance in the target field is equal to the variance in the noise field. Thus the above probability model is modified to calculate only $\sigma^2{}_n^0$ and then to equate $\sigma^2{}_{n,m}^A$ for all hypotheses to $\sigma^2{}_n^0$. Computationally the model is less stressing to implement due to the reduced number of independent parameters. Steps (13) and (14) calculate the likelihood ratio statistic of hypothesis $H_m$ versus the hypothesis $H_0$ that there is no target present. The probability distributions under consideration are both absolutely continuous with respect to Lebesque measure on the real line, so the Radon-Nikodym derivative described above for the likelihood ratio becomes, by the Chain Rule, simple division of probability densities. The log of the likelihood in the Quadratic model is given by the formula $$llr_m = \quad (4)$$

$$-\frac{1}{2} \sum_{n \in I(m)} \left[ \frac{(Z_n - \mu_{n,m}^A)^2}{\sigma^2{}_{n,m}^A} - \frac{(Z_n - \mu_n^0)^2}{\sigma^2{}_n^0} + \ln(\sigma_{n,m}^A/\sigma_n^0) \right]$$

where $$I(m) = \{n \,|\, \mu_{n,m}^A \neq \mu_n^0 \text{ or } \sigma^2{}_{n,m}^A \neq \sigma^2{}_n^0\} \quad (5)$$

and the $\mu$'s and $\sigma$'s are as defined in this disclosure above. The set $I(m)$ is the set of pixels where these two predictions differ between hypothesis 'm' and the no target hypothesis. For the Linear theory and its attendant probability model, the computations are similar; the formulae used are $$llr_m = \sum_{n \in I(m)} \left\{ \frac{Z_n(\mu_{n,m}^A - \mu_n^0)}{\sigma_n^0} - \frac{1}{2} \frac{[(\mu_{n,m}^A)^2 - (\mu_n^0)^2]}{\sigma_n^0} \right\}, \quad (6)$$

Figure 6A:
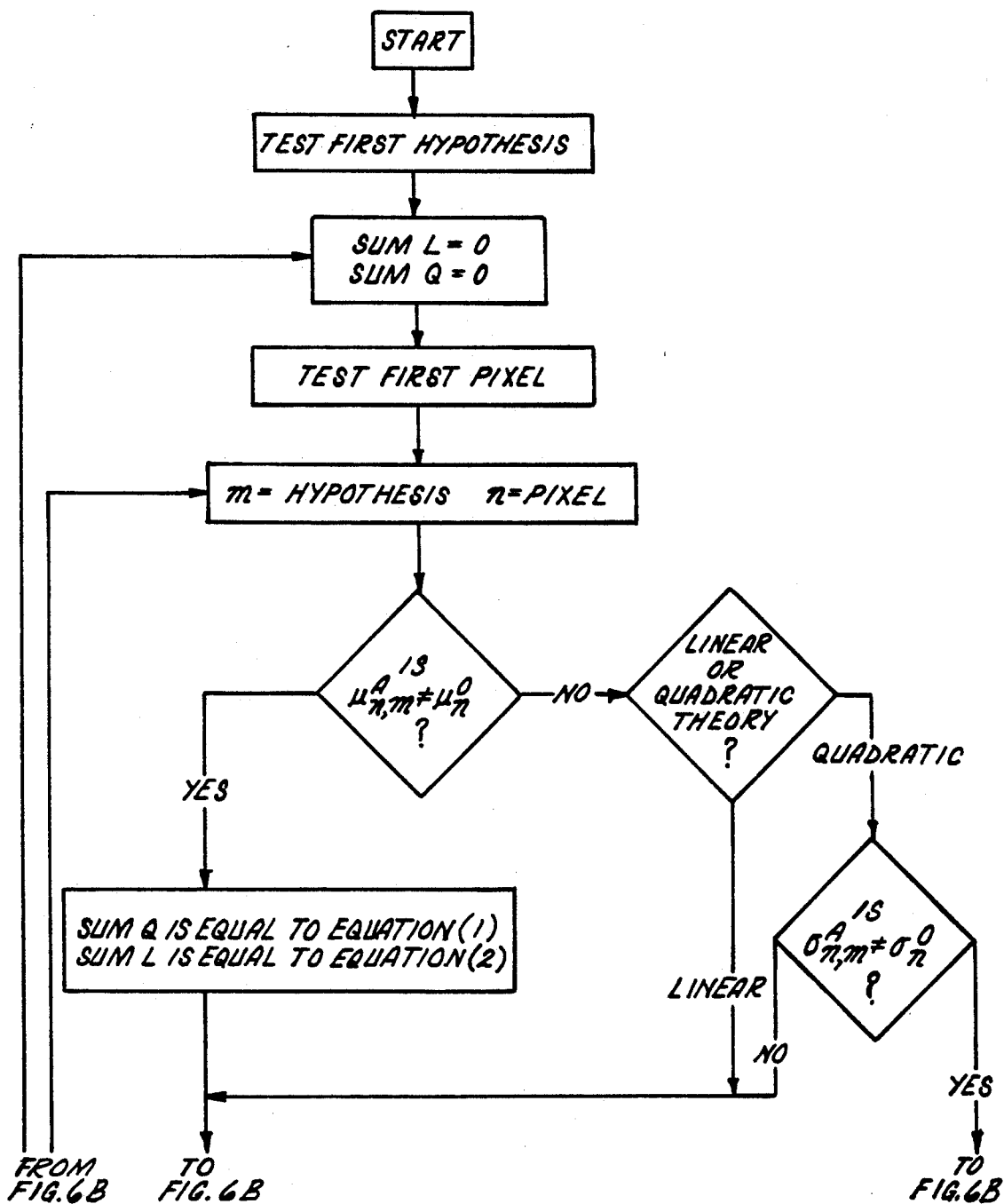
FIGS. 6A-6B is a flow chart depicting the calculation of likelihood ratios.
Figure 6B:
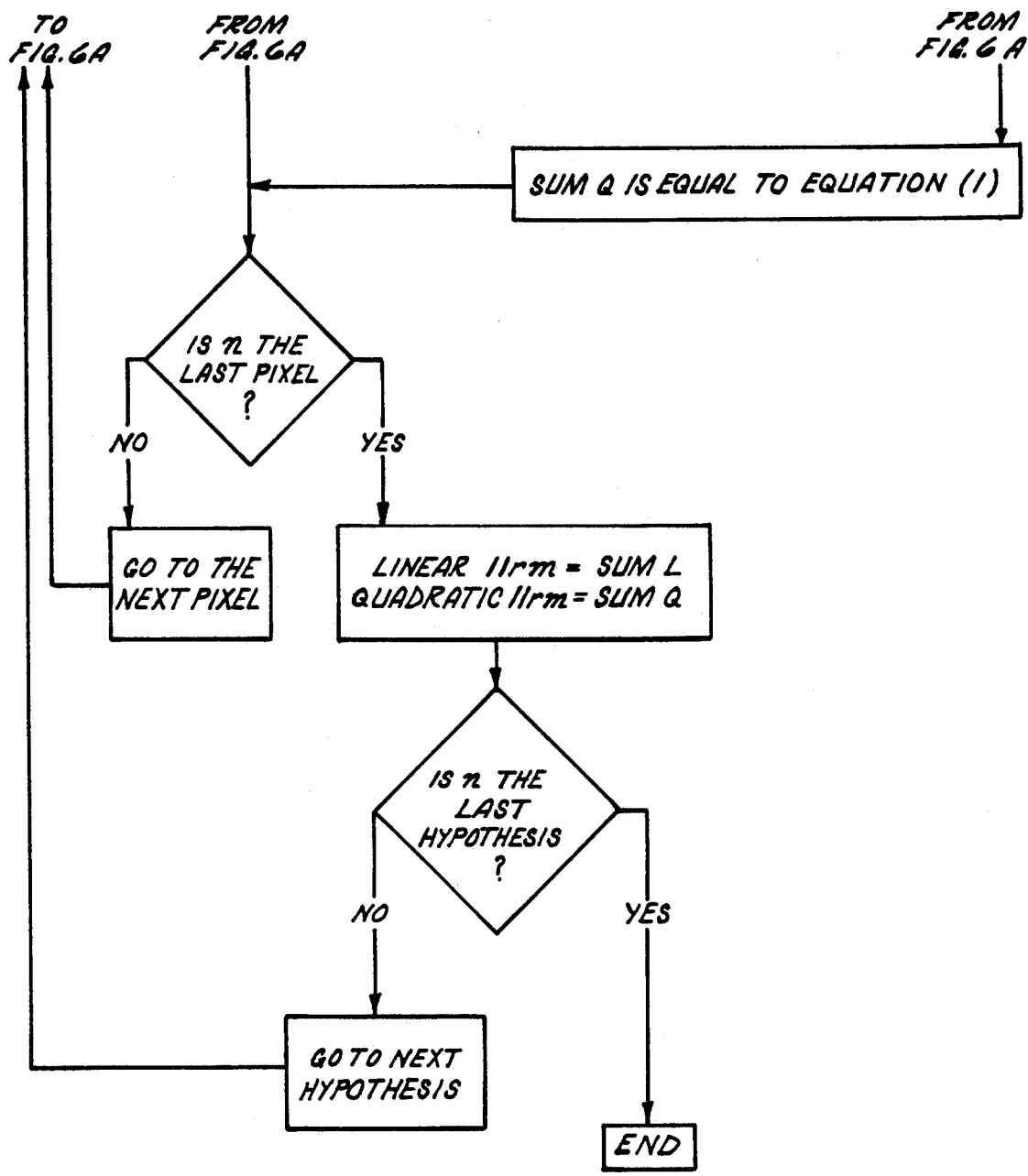

FIGS. 6A and 6B demonstrate in more detail the logic used in the algorithm to calculate these log likelihood ratio statistics for both theories. The formulas for Sum Q and Sum L in FIGS. 6A and 6B are as follows:

Sum $Q =$ $$\text{Sum } Q = \frac{1}{2} \left\{ \frac{(Z_n - \mu_{n,m}^A)^2}{s_{n,m}^A} - \frac{(Z_n - \mu_n^0)^2}{s_n^0} + \ln \left( \frac{s_{n,m}^A}{s_n^0} \right) \right\}$$

$$\text{Sum } L = \text{Sum } L + \frac{Z_n(\mu_{n,m}^A - \mu_n^0)}{s_n^0} - \frac{1}{2} \frac{(\mu_{n,m}^A)^2 - (\mu_n^0)^2}{s_n^0}$$

In Step (15) color images of the likelihood ratio statistic are shown to the user for reference in a format similar to the display described in Step (9) for the data stream. In Step (16) the prior probabilities of the hypotheses are input. The prior probabilities summarize all previous information available to the algorithm. The prior probabilities may be uniformly distributed over the hypotheses or may be weighted in accordance with the belief that some target states are more likely than others. In Step (17) the Likelihood ratio statistics are multiplied by the prior probabilities to produce intermediate probabilities in preparation for implementing the optimal decision rule in Step (20).

In Step (18) the Bayesian Gain Matrix is input. The gain function gives the statistician flexibility in tailoring the algorithm for the exact problem at hand. Suppose that one of the target states is of particular interest to the operator. For example, the ship being guarded may be vulnerable to mines directly in front of it, and less vulnerable to mines off on the side. The statistician can increase the gain of the states corresponding to the target being in front of the ship. The effect of doing this is that the algorithm will be more likely to choose a state with the target in front of the ship as its decision if there are several competitors that have nearly equal likelihood ratios. Changing the gain function in this manner will of course change the relation between false alarms and missed detections in the region in front of the ship. Hypotheses in that region will be signaled more often than hypotheses corresponding to targets not in front of the ship; the probability of detection will go up, but so will the probability of false alarm. In the other direction, there may be target states that will force the operator to take a drastic action, for example to launch a weapon. The operator would not like to do this except in the event that the target is actually in one of the critical states and the operator is very sure that the target is there. By decreasing the gain corresponding to the critical states, the operator can be more certain that a target actually is in the critical state when the algorithm indicates such a conclusion. In Step (19) each element of the three dimensional array produced as output from Step (17) (the intermediate probabilities) is multiplied by the corresponding diagonal element in the Bayesian Gain Matrix. Again this is in preparation for implementing the decision rule.

The statistical decision on target state is made using a Bayesian decision theory approach. Many hypotheses are postulated in target state. Possible states may include the target location, its depth, orientation, or even identity. One of the hypotheses in our model is that there is no target present. Many actions (in the decision theory parlance) are also set up. For the problem under consideration, the actions consist of choosing one of the operative hypotheses. One of the actions must be taken; in no case may the algorithm decide to decline to make a decision. In some statistical setups one of the possible actions is to pass, but we are not allowing this possibility. For every combination of action and hypothesis, a gain is set up. The gain is described below. In the implementation of our algorithm for use with the detection system, our gain matrix is diagonal, so that the only nonzero gains present are when a hypothesis holds in truth and the algorithm chooses this hypothesis as its decision. There is no gain for being close in some metric to the actual target state.

In general, a decision rule consist of maximizing the expected gain given that a particular realization of the data has been observed. A decision rule is then a mapping from the space of all possible data realizations to the set of possible actions. With the gain matrix set up as we have done, it is possible to explicitly compute the optimal decision rule in a rather simple fashion.

In order to set terminology, we label the hypotheses $H_0, H_1, \ldots, H_M,$ where $H_0$ is the null hypothesis that the target is absent, and hypotheses $H_1, \ldots, H_M$ are mutually exclusive alternative hypotheses on the target's position.

The actions available to the statistician are numbered $A_0, A_1, \ldots, A_M,$ where $A_i$ corresponds to the selection of hypothesis $H_i$. A gain function $G(A_i, H_j) \quad i,j = 0, 1, \ldots, M$ is postulated, where $G(A_i, H_j)$ represents the gain to the statistician if action $A_i$ is selected when in truth hypothesis $H_j$ pertains.

A prior probability distribution on the hypotheses is postulated, where $\Pr\{H_0\} = P_0,$ and $\Pr\{H_m\} = (1 - P_0) \cdot P_m.$ Data is collected through the sensor. The data is modeled through the use of likelihood functions $l(Y | H_j) j = 0, 1, \ldots, M.$ Appropriate likelihood functions for the problem at hand have been described above in the discussion of physical and optical modeling (c.f. Steps (4) through (7)).

A decision rule is a function (randomized or deterministic)

$D: \{Y\} \rightarrow \{A_i\}$ from the space of all possible data to the set of actions. The problem is to find an optimal decision rule given the preceding model. An optimal decision rule is one which maximizes the expectation of the Bayes gain. The expected gain under a specific decision rule D is $$P(D) = \sum_j [\int G(D(Y),H_j)l(Y|H_j)Pr\{H_j\}dY].$$

Since the number of hypotheses is finite, we may switch the order of integration and summation with impunity and determine an optimal decision rule to be one which, when presented with data Y, selects action $A_{i^*}$, where $i^*$ maximizes $$P(A_i|Y) = \sum_j G(A_i,H_j)l(Y|H_j)Pr\{H_j\}.$$

We assume that the gain matrix is diagonal, so that $$G(A_i,H_j) = g_i\delta(i,j),$$

where $\delta(i,j)$ is the discrete version of the Dirac delta function. Then we may explicitly compute the optimal decision rule and conveniently write it as:

1. Chose $A_0$ if $$\max_m \left( g_m \frac{l(Y|H_m)}{l(Y|H_0)} (1-P_0) P_m \right) < g_0 P_0$$

2. Choose $A_m^*$ if

-continued $$\max_m \left( g_m \frac{l(Y|H_m)}{l(Y|H_0)} (1-P_0) P_m \right) \geq g_0 P_0$$

and $m^*$ is the maximizing $m$.

This is the rule implemented in Step (20). The quantity $g_0$ is then the detection threshold.

The threshold provides a means to trade off between missed detections and false alarms; it is a measure of how consistent the data must be with a certain hypothesis before it is chosen. If the threshold is high, then very often the algorithm will signal "no target." On the other hand, if the threshold is low, then the algorithm will quite often say that a target is present, but may be fooled by spurious statistical fluctuations. Because of the statistical nature of the phenomena under consideration, it is impossible to produce an algorithm which always produces the correct decision.

In Step (21) the human operator is notified of the optimal decision. In Step (22), the translation of the target state from pixel space to absolute latitude, longitude and depth is made and displayed to the operator in convenient form for correlation with data from subsequent laser pulses or to direct a further course of action. In Step (23) the algorithm sets up variables for another stream of data. Step (24) is the conclusion of the algorithm for one laser pulse.

TABLE 1

| Parameter | Physical Definition | Input Units | MKS Units |
|---|---|---|---|
| Universal Constants | | | |
| h | Planck's constant | J-sec | J-sec |
| c | Speed of light in vacuum | m/sec | m/sec |
| Environmental Inputs | | | |
| T | Air-water interface transmittance | Dimensionless | Dimensionless |
| k | Diffuse attenuation coefficient of water | 1/m | 1/m |
| n | Refractive index of water | Dimensionless | Dimensionless |
| lambda | Wavelength (frequency doubled Nd:YAG) | nanometers | m |
| beta(180) | Backscatter coefficient of water | 1/(m*sr) | 1/(m*sr) |
| Isum (1500) | Solar irradiance at surface | W/m 2mu-m | W/m 2/m |
| Gamma surface | Diffuse reflectivity of surface | Dimensionless | Dimensionless |
| Equipment Inputs | | | |
| E0 | Energy per pulse | Joule | Joule |
| rho | Pulse rate | sec $-1$ | sec $-1$ |
| Tout | Outgoing transmittance (laser to ocean) | Dimensionless | Dimensionless |
| Psi | Gaussian beam to flat-topped irradiance conversion | Dimensionless | Dimensionless |
| Ap | Pixel area at photocathode | m 2 | m 2 |
| f/# | f-number | Dimensionless | Dimensionless |
| Tin | incoming transmittance (ocean to cathode) | Dimensionless | Dimensionless |
| eta | Quantum efficiency of cathode (not used in this vers | Dimensionless | Dimensionless |
| FWHM | Bandwidth of filter (FWHM) | nanometers | m |
| theta | Beam half-angle divergence | degree | radians |
| Nrow | Number of pixel rows in CCD grid | Dimensionless | Dimensionless |
| Ncol | Number of pixel columns in CCD grid | Dimensionless | Dimensionless |
| Target Related Inputs | | | |
| Gamma | Target diffuse reflectivity | Dimensionless | Dimensionless |
| Dt | Diameter of the target | ft | m |
| dt | Target depth | ft | m |
| Search Platform Related Inputs | | | |
| h | Altitude of the search platform | ft | m |
| v | Speed of the search platform | knots | m/sec |
| gw | Gate width | ft | m |
| ng/scan | Number of gates per scan | Dimensionless | Dimensionless |
| Pfa | Probability of false alarm | Dimensionless | Dimensionless |

TABLE 2

Step 0

Assumptions:

0. T(i,j) represents the number of photo

TABLE 2-continued

Step 0 electrons produced by the photocathode
1. T(i,j) is a multiple of a Poisson
2. T(i,j) is Independent for i ≠ i' or j ≠ j'
3. Rate parameter $N_0$ under $H_0$ is a function of depth and other environmental parameters
4. Rate parameter $T_0$ under $H_A$ is a function of depth, other environmental parameters and whether depth gate is above, at, or below target
5. $\eta$ is constant and equal to quantum efficiency ≈ .07
6. $N_0$ is the rate at which photons strike the photocathode being reflected from a region not containing the the target
7. $T_0$ is the rate at which photons strike the photocathode being reflected from a region which does contain target Moments:

| $H_0$ | $H_A$ |
|---|---|
| $E[T(i,j)] = N_0 \, \eta$ | $E[T(i,j)] = T_0 \, \eta$ |
| $Var[T(i,j)] = N_0 \, \eta^2$ | $Var[T(i,j)] = T_0 \, \eta^2$ |

TABLE 3

Step 1

Model:

$$M(i,j) = \sum_{k=0}^{T(i,j)} R_k$$

Assumptions:
1. $R_k$ is Poisson
2. $R_k$ is independent over k and (i,j)
3. $E[R_k] = \lambda$
4. $\lambda$ is constant over (i,j) and time.
5. If $\lambda$ is large (i.e. > 50) M(i,j) is approximately Gaussian
6. $\lambda \approx .7 \cdot (10 \rightarrow 10^4)$ depending upon variable gain Moments:

| $H_0$ | $H_A$ |
|---|---|
| $E[M(i,j)] = \lambda \, N \, \eta$ | $E[M(i,j)] = \lambda \, T \, \eta$ |
| $Var[M(i,j)] = (\lambda\eta + \lambda^2\eta^2) \, N$ | $Var[M(i,j)] = (\lambda\eta + \lambda^2\eta^2) \, T$ |

TABLE 4

Step 2

Model:
$P(i,j) = \beta \, M(i,j)$

Assumptions:
1. $\beta$ is deterministic
2. $\beta$ is independent of (i,j) and time
3. $\beta \approx 10$ Moments:

| $H_0$ | $H_A$ |
|---|---|
| $E[P(i,j)] = \beta \, \lambda \, N \, \eta$ | $E[P(i,j)] = \beta \, \lambda \, T \, \eta$ |
| $Var[P(i,j)] = \beta^2(\lambda\eta + \lambda^2\eta^2)N$ | $Var[P(i,j)] = \beta^2(\lambda\eta + \lambda^2\eta^2)T$ |

TABLE 5

Step 3

Model:
$F(i,j) = f \, P(i,j)$

Assumptions:
1. f is deterministic
2. f is independent of (i,j) and time
3. $f \approx .5$ Moments:

| $H_0$ | $H_A$ |
|---|---|
| $E[F(i,j)] = f \, \beta \, \lambda \, N \, \eta$ | $E[P(i,j)] = f \, \beta \, \lambda \, T \, \eta$ |
| $Var[F(i,j)] = f^2 \, \beta^2 \, (\lambda\eta + \lambda^2\eta^2) \, N$ | $Var[P(i,j)] = f^2 \, \beta^2 \, (\lambda\eta + \lambda^2\eta^2) \, T$ |

TABLE 6

Step 4

Model:
$C(i,j) = c \, F(i,j) + DC(i,j) + TE(i,j)$

Assumptions:
1. c is deterministic
2. c is independent of (i,j) and time
3. c represents the efficiency with which photo electrons coming throught the fibre optic bundle are converted to voltages ≈ .1
4. DC(i,j) is the dark current produced by the CCD whether or not photoelectrons accumulate in the array
5. Assume DC(i,j) is Gaussian with mean $\mu_{DC}$, variance $\sigma^2_{DC}$
6. $\mu_{DC}$ and $\sigma^2_{DC}$ are independent of (i,j) and time
7. TE(i,j) is trapped photo electrons remaining from the last CCD conversion to voltage
8. Assume TE(i,j) is independent and Gaussian with mean $\mu_{TE}$ and $\sigma^2_{TE}$ are independent of (i,j) and time Moments:

| $H_0$ | $H_A$ |
|---|---|
| $E[C(i,j)] = c \, f \, \beta \, \lambda \, \eta \, N + \mu_{DC} + \mu_{TE}$ | $E[C(i,j)] = c \, f \, \beta \, \lambda \, \eta \, T + \mu_{DC} + \mu_{TE}$ |
| $Var[C(i,j)] = c^2 \, f^2 \, \beta^2 \, (\lambda\eta + \lambda^2\eta^2) \, N + \sigma^2_{DC} + \sigma^2_{TE}$ | $Var[C(i,j)] = c^2 \, f^2 \, \beta^2 \, (\lambda\eta + \lambda^2\eta^2) \, T + \sigma^2_{DC} + \sigma^2_{TE}$ |

TABLE 7
Step 5

Model:
V(i,j) = α C(i,j) + TN(i,j)

Assumptions:
1. α is deterministic
2. α is independent of (i,j) and time
3. TN(i,j) is thermal noise
4. Assume TN(i,j) is independent and Gaussian with mean $\mu_{TN}$ and variance $\sigma^2_{TN}$
5. $\mu_{TN}$ and $\sigma^2_{TN}$ is independent of (i,j) and time

Moments:

| $H_0$ | $H_A$ |
|---|---|
| $E[V(i,j)] = \alpha [c f \beta \lambda \eta N + \mu_{DC} + \mu_{TE}] + \mu_{TN}$ | $E[V(i,j)] = \alpha [c f \beta \lambda \eta T + \mu_{DC} + \mu_{TE}] + \mu_{TN}$ |
| $Var[V(i,j)] = \alpha^2 [c^2 f^2 \beta^2 (\lambda \eta + \lambda^2 \eta^2) N + \sigma^2_{DC} + \sigma^2_{TE}] + \sigma^2_{TN}$ | $Var[V(i,j)] = \alpha^2 [c^2 f^2 \beta^2 (\lambda \eta + \lambda^2 \eta^2) T + \sigma^2_{DC} + \sigma^2_{TE}] + \sigma^2_{TN}$ |

The microfiche appendix attached hereto is a listing of the source code used in conjunction with the automatic target detection process of this invention. This source code includes the routines for reading the data from the input master window, the simulation of the photon counts, the calculation of the likelihood function, and the application of the decision logic, as well as numerous routines to display the data in color format on the Macintosh II.

II. Physical Model

Suppose that one has a data vector $\hat{Z}=(\hat{z}_n : 1 \leq n \leq N)$ consisting of N real numbers collected in an experiment. In the case of interest, the experiment consists of generating an array of video levels by using a gated camera to obtain reflections from a subsurface depth stratum as described in the above-referenced patent application. The data set in this instance consists of the elements in the array of video levels extracted from the camera's CCD. Since the data set varies from one exposure to another, it is assumed that the data sets are samples of a random vector $\tilde{Z} = \{\tilde{z}_n : 1 \leq n \leq N\}$.

Now assume that there are probability measures $\mu_0$ and $\mu_m$ on the sample space of $\tilde{Z}$ corresponding to the hypothesis $H_0$ that the target is not present, and the respective hypothesis $H_m$ that the target is present and is in "state" m, where m is a member of a parameter space M. The output of the automatic target detection algorithm described above is a decision that the target either is not present or is present in one or more of the possible states. In the classical case of a simple hypothesis versus a simple alternative, a best critical region is determined by the Neyman-Pearson theory.

The likelihood ratio statistic for testing the null hypothesis $H_0$ against an alternative $H_m$ can be written formally as $$L(\hat{Z}|m) = \frac{F(\hat{Z}|H_m)}{F(\hat{Z}|H_0)}$$

where the probability density $F(\hat{Z}|H)$ is the Radon-Nikodym derivative of the probability measure $\mu$ with respect to a suitably chosen basis measure on the sample space of the random vector $\tilde{Z}$. For a single alternative m, one can set a threshold T and declare that alternative $H_m$ holds whenever $$L(\hat{Z}|m) > T.$$

The threshold is determined by the allowable false alarm probability Pfa. The Neyman-Pearson lemma guarantees that this decision will maximize detection probability under the constraint that the false alarm probability is less than Pfa.

The present invention described hereinafter provides a means for implementing the theory described above as well as related theories for multiple target state alternatives based upon Bayesian approaches. The essential point is that a method must be provided for computing the probability densities F under various hypotheses about the target's state. The physical model described below provides the means for doing this.

Specifically, the model allows computation of the mean $\mu_n^0$ and the standard deviation $\sigma_n^0$ of the output video level $\tilde{z}_n$ for the nth pixel when the target is not assumed present (the null hypothesis). In addition, the model allows computation of the mean $\mu_{n,m}^A$ and the standard deviation $\sigma_{n,m}^A$ of the output video level $\tilde{z}_n$ for the nth pixel when the target is in the state specified by the mth alternative hypothesis. Under Gaussian assumptions, these parameters permit computation of the probability densities F and are precisely the values required by the ATD algorithm described in detail above.

The process for obtaining estimates of the first two moments (mean and variance) of the digitized pixel video levels under various hypotheses concerning the target's state is carried out in the following steps:

(1) Compute the mean and variance of the laser irradiance function at the depth of interest for the hypothesis under consideration.

(2) Compute the mean and variance of the resulting radiance function from the top surface of the depth stratum, due to backscattering from the water volume and due to reflection or obscuration from the target if it is assumed present under the given hypothesis.

(3) Compute the mean and variance of the intensity function which is obtained from integrating the radiance function over the projected area of a pixel at the top surface of the depth stratum.

(4) Compute the mean and variance of the power which is imaged on the focal plane by integrating the intensity function over the solid angle subtended by the entrance aperture of the camera and by accounting for attenuation and other transmission losses.

(5) Compute the mean and variance of the power reflected back into the camera from the sun and sky.

(6) Compute the mean and variance of the number of photons corresponding to the total energy received from and imaged on a pixel on the focal plane over the time duration of the camera exposure gate width. This total energy is the sum of reflected laser energy and reflected sunlight and skylight energy.

(7) Compute the mean and variance of the digitized pixel video levels on the CCD array by use of a measured camera "transfer function" (or, alternatively, by use of a model for the camera).

Let $\mu$ and $\sigma$ denote, respectively, the mean and standard deviation of the digitized pixel video levels resulting from step (7), and recall that the variance is $\sigma^2$. More specifically, let $\mu_n{}^0$ and $\sigma_n{}^0$ denote the mean and standard deviation of the output for the nth pixel when the target is not assumed present (the null hypothesis). Moreover, let $\mu_{n,m}{}^A$ and $\sigma_{n,m}{}^A$ denote the mean and standard deviation of the output for the nth pixel when the target is in the state specified by the mth alternative hypothesis. These are precisely the values required by the ATD algorithm.

The above process is illustrated below by giving a concrete example involving a specific model. It will be appreciated that it is the process rather than the specific model that constitutes the present invention.

The model to be described is termed the "Poisson model" since it will be assumed that the probability distributions resulting from the various steps (exclusive of step (7)) are Poisson. Since the variance of a Poisson distribution is equal to its mean, only the formulas for mean values are given. We note that models can be developed under different assumptions and will in general give different results. As knowledge of the physics of radiative transfer in the ocean improves, the models employed in the above processes can be updated to reflect these new advances.

The steps in the processes are now described for the Poisson model. Table 1 provides definitions of the various terms in the equations. A rectangular coordinate system is established so that x and y denote position in the horizontal plane and positive z denotes depth below the surface.

Step (1). This step computes the mean of the laser irradiance function $F_1$ at depth z. The variance is equal to the mean.

Equation (7) is the mathematical description of the irradiance function (power per unit area) at depth z. If $\tau$ is the pulse width in seconds, and $A_{beam}(h,z)$ is the area of the beam at depth z when the laser system is at altitude h, then $$F_1(x,y,z) = \frac{\Psi T_{out} T(E_0/\tau) e^{-kz}}{A_{beam}(h,z)}, \quad (7)$$

for all points (x,y,z) within the area covered by the beam.

The output energy of the light source, $E_0$, is attenuated by the transmitter optics. The transmission of the transmitter optics is accounted for using $T_{out}$ in equation (7). The nonuniformity of the light source is averaged, and an effective average pulse energy is used. $\Psi$ is the averaging factor which converts the measured pulse energy to an average energy over the receiver field of view. After correction for uniformity and transmitter optics attenuation, the transmitter beam travels to the air/water interface where a portion of the energy is reflected from the beam. The transmission of the air/water interface is specified by T. The beam is refracted at the interface and travels to depth z. Attenuation of the beam energy by the water is accounted for by the $e^{-kz}$ factor. The pulse power is spread over the area illumination spot.

To arrive at the irradiance, i.e., power per unit area, at depth z, the power is divided by $A_{beam}(h,d)$ resulting in the expression in equation (7).

Step (2). This step computes the mean radiance function $F_2$ at depth $z_k$ corresponding to the top of the kth depth gate. The vertical width of the kth depth gate is denoted $\Delta_k$. The variance is equal to the mean.

Suppose first that the target is present and that its top surface is at depth $d_T$. Equation (8a) describes the radiance function which is expressed as power per unit area per unit solid angle in the direction $\theta$. Here $\pi/2 \leq \theta \leq \pi$, and $\theta = \pi$ represents reflection in the direction opposite to the direction of transmission. Then $$F_2(x,y,k,\theta) = \quad (8a)$$

$$F_1(x,y,z_k)A_{beam}(h,z_k)\left\{\frac{\exp(-2k(d_T - z_k))\Gamma\cos(\theta)}{\pi A_{beam}(h,d_T)} + \beta(\theta)\int_{z_k}^{d_T}\frac{\exp(-2k(d_T - z_k))}{A_{beam}(h,z)}dz\right\}.$$

When the target is above the depth stratum of interest, then the returning energy is obscured, and the radiance $$F_2(x,y,k,\theta) = 0, \quad (8b)$$

for values of (x,y) in the projected area of the target.

When the target is not present, then the returning energy is from volume backscattering alone. The result is $$F_2(x,y,k,\theta) = \quad (8c)$$

$$F_1(x,y,z_k)A_{beam}(h,z_k)\beta(\theta)\int_{z_k}^{z_k + \Delta_k}\frac{\exp(-2k(z - z_k))}{A_{beam}(h,z)}dz.$$

Step (3). This step computes the mean intensity function $F_3$ at depth z by integrating the radiance function over the projected area of a pixel. The variance is equal to the mean.

Equation (9a) provides an expression for the intensity of radiation from a region $\mathscr{A}_{ij}$ which is the projection of the (i,j)th pixel on the focal plane of the camera. The expression is $$F_3(i,j,k,\theta) = \int_{\mathscr{A}_j} F_2(x,y,k,\theta)dxdy. \quad (9a)$$

Let $A_{pixel}$ be the area of a pixel on the focal plane of the camera. Then the projected area of the pixel at depth $z_k$ is given by $$\frac{A_{pixel}}{f^2}\left[h + \frac{z}{n}\right]^2,$$

where f is the focal length of the camera and n is the reflective index of water. Consequently, in the case where the radiance $F_2(x,y,k,\theta)$ does not vary significantly over the projected area of a pixel, one has $$F_3(i,j,k,\theta) = \frac{A_{pixel}}{f^2}\left[h + \frac{z}{n}\right]^2 F_2(x_{ij},y_{ij},k,\pi) \tag{9b}$$

where $x_{ij}$ and $y_{ij}$ are points within the projection of the $ij^{th}$ pixel.

Step (4). This step computes the mean power $F_4$ imaged on a pixel on the focal plane. The variance is equal to the mean.

$$F_4(i,j,k) = \Omega T_{in} T \exp(-kz_k) F_3(i,j,k,\pi) \tag{10}$$

The transmission of the receiver optics is accounted for using $T_{in}$ in equation (9a). The transmission of the air-/water interface is again specified by T. Attenuation of the beam energy by the water is accounted for by the $\exp(-kz_k)$ factor.

The solid angle $\Omega$ of the entrance aperture of the receiver as seen from the point $(x_{ij}, Y_{ij}, z_k)$, expresses the power from the target which is directed in such a way as to reach a single pixel in the receiver. The direction angle is essentially $\pi$ which therefore appears in the expression for $F_3$. If D is the diameter of the entrance aperture of the receiver, then $$\Omega = \frac{\pi D^2}{4n^2\left(h + \frac{z}{n}\right)^2},$$

and $F_4$ can be written $$F_4(i,j,k) = \frac{\pi D^2}{4n^2\left(h + \frac{z}{n}\right)^2} T_{in} T \exp(-kz_k) \frac{A_{pixel}}{f^2}\left[h + \frac{z}{n}\right]^2 F_2(x_{ij},y_{ij},k,\pi)$$

$$= \frac{\pi T_{in} T \exp(-kz_k) A_{pixel}}{4n^2 f\#^2} F_2(x_{ij},y_{ij},k,\pi).$$

Step (5). This step computes the mean power $F_5$ imaged on a pixel on the focal plane as a result of light contributed by the sun and the sky. The variance is equal to the mean.

The energy collected by the camera from the sun and sky is the same for all pixels on the focal plane. For each of these pixels, the energy is given by $$Y = \frac{\lambda}{hc} \frac{I_{sun} T_{in} \Gamma_{water} A_{pixel}}{4f\#^2}(\tau_{gate}FWHM), \tag{11}$$

where, as above, the various terms are defined in Table 1.

Step (6). This step computes the mean number of photons corresponding to the total energy incident on a pixel on the focal plane. The variance is equal to the mean.

The mean number of photons $P_{ijk}$ on the focal plane for the (i,j)-th pixel corresponding to the k-th depth is given by $$P_{ijk} = Y + \frac{\lambda \tau}{hc} F_4(i,j,k)$$

$$= Y + \frac{\lambda \tau}{hc} \frac{\pi T_{in} T \exp(-z_k) A_{pixel}}{4n^2 f\#^2} F_2(x_{ij},y_{ij},k,\pi).$$

Let the symbol n also represent the indices (i,j,k), where (i,j) indicates the pixel on the focal plane and k indicates the depth stratum.

When the target is assumed present, the mean number of photons corresponding to index n under the m-th hypothesis is denoted $T_{n,m}$ and is given by $$T_{n,m} = Y \tag{12a}$$

when the pixel index corresponds to a volume which is obscured by the target.

When the target is assumed present, and the top surface of the target lies within the volume corresponding to the pixel index n, then the target is seen in reflection and $$T_{n,m} = Y + \frac{\lambda \tau}{hc} \frac{\pi T_{in} T \exp(-kz_k) A_{pixel}}{4n^2 f\#^2} F_2(x_{ij},y_{ij},k,\pi) \tag{12b}$$

$$= Y + \frac{\lambda}{hc} \frac{E_0 \Psi T_{in} T_{out} T^2 A_{pixel}}{4n^2 f\#^2} \left\{ \frac{\exp(-2kd_T)\Gamma}{A_{beam}(h,d_T)} + \pi\beta(\pi) \int_{z_k}^{d_T} \frac{\exp(-2kz)}{A_{beam}(h,z)} dz \right\}.$$

When the target is assumed present, and the top surface of the target lies below the volume corresponding to the pixel index n, then the mean number of photons corresponding to index n is given by $$T_{n,m} = Y + \frac{\lambda \tau}{hc} \frac{\pi T_{in} T \exp(-kz_k) A_{pixel}}{4n^2 f\#^2} F_2(x_{ij},y_{ij},k,\pi) \tag{12c}$$

$$= Y + \frac{\lambda}{hc} \frac{E_0 \Psi T_{in} T_{out} T^2 A_{pixel}}{4n^2 f\#^2} \pi\beta(\pi) \int_{z_k}^{z_k + \Delta_k} \frac{\exp(-2kz)}{A_{beam}(h,z)} dz.$$

When the target is assumed not present, the mean number of photons corresponding to index n under the m-th hypothesis is denoted $N_n$ and is given by $$N_n = Y + \frac{\lambda}{hc} \frac{E_o \Psi T_{in} T_{out} T^2 A_{pixel}}{4n^2 f\#^2} \pi \beta(\pi) \int_{z_k}^{z_k + \Delta_k} \frac{\exp(-2kz)}{A_{beam}(h,z)} dz \quad (12d)$$

Step (7). This step computes the mean number of digitized pixel video levels on the CCD array. The variance is also computed and may not be equal to the mean.

The transfer function must be measured or modeled for the camera considered. Let $\mathcal{F}$ denote the transfer function for the mean and $\mathcal{V}$ denote the transfer function for the variance. As above, let $\mu_n^0$ and $\sigma_n^0$ denote the mean and standard deviation of the output for the nth pixel when the target is not assumed present (the null hypothesis), and let $\mu_{n,m}^A$ and $\sigma_{n,m}^A$ denote the mean and standard deviation of the output for the nth pixel when the target is in the state specified by the mth alternative hypothesis.

Then $\mu_n^0 = \mathcal{F}(N_n),$ $(\sigma_n^0)^2 = \mathcal{V}(N_n),$ $\mu_{n,m}^A = \mathcal{F}(T_n),$ and $(\sigma_{n,m}^A)^2 = \mathcal{V}(T_n),$ While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of visually displaying a target viewed by an imaging sensor means, the imaging sensor means including pulsed light source means and gated camera means and wherein the imaging sensor means is positioned on an airborne platform and images targets under water and wherein said gated camera means includes a focal plane and an entrance aperture, including the steps of:
    a) calculating the hypothetical distributions of the number of photons impinging on the gated camera means using a hypothetical physical and optical model;
    b) obtaining actual target data from targets imaged underwater by the imaging sensor means;
    c) processing said actual target data;
    d) delivering said actual target data to an automatic target detection system;
    e) employing said calculated hypothetical distributions in said automatic target detection system by a comparison of said calculated hypothetical distributions with said processed actual target data to thereby improve in the detection of a target viewed by the imaging sensor means; and
    f) visually displaying a target viewed by the imaging sensor means based on the improvement in target detection obtained from step (e).

2. The method of claim 1 including multiple processing units for parallel processing and including the step of:
calculating said hypothetical distributions in at least some of said multiple processing units.

3. The method of claim 1 wherein the hypothetical physical and optical model for calculating the hypothetical distribution of the number of photons impinging on the gated camera means of the imaging sensor means is determined from the steps of:
    (1) calculating the mean and variance of the pulsed light source irradiance function $F_1$ at the depth of interest for the hypothesis under consideration;
    (2) calculating the mean and variance of the resulting radiance function $F_2$ from the top surface of the depth stratum due to backscattering from the water volume and due to reflection or obscuration from the target if it is assumed present under the given hypothesis;
    (3) calculating the mean and variance of the intensity function $F_3$ which is obtained from integrating the radiance function over the projected area of a pixel at the top surface of the depth stratum;
    (4) calculating the means and variance of the power $P_4$ which is imaged on the focal plane of the camera means by integrating the intensity function $F_3$ over the solid angle subtended by the entrance aperture of the camera means and by accounting for attenuation and other transmission losses;
    (5) calculating the mean and variance of the power $P_5$ reflected back into the camera means from the sun and sky;
    (6) calculating the means and variance of the number of photons corresponding to the total energy received from and imaged on a pixel on the focal plane over the time duration of the camera means exposure gate width wherein said total energy corresponds to the sum of reflected laser energy and reflected sunlight and skylight energy; and
    (7) calculating the mean and variance of the digitized pixel video levels on the focal plane to determine $\mu_n 0$, $\sigma_n 0$ and $\mu_{n,m}^A$ and $\sigma_{n,m}^A$.

4. The method of claim 3 wherein the variance is equal to the mean in step (1) and wherein the pulsed light source irradiance function $F_1$ of step (1) at a depth z is determined by the equation:

$$F_1(x,y,z) = \frac{\Psi T_{out} T (E_o/\tau) e^{-kz}}{A_{beam}(h,z)},$$

where
$\tau$ = pulse width in seconds;
$A_{beam}(h,z)$ = area of the beam at depth z when the imaging sensor is at altitude h;
$E_o$ = output energy of the pulsed light source;
$T_{out}$ = transmission of the transmitter optics; and
$\Psi$ = averaging factor which converts the measured pulse energy to an average energy over the field of the gated camera means.

5. The method of claim 3 wherein the variance is equal to the mean in step (2) and wherein radiance function $F_2$ of step (2) a depth $z_k$ corresponding to the top of the Kth depth gate and wherein the radiance function $F_2$ is expressed as power per unit area per unit solid angle in the direction and is determined by the following equation (1) when the target is present and the top surface of the target is at depth d, equation (2) when the target is above the depth stratum of interest and the returning energy is obscured and equation (3) when the target is not present and the returning energy is from volume backscattering alone:

$$F_2(x,y,k,\theta) = F_1(x,y,z_k) A_{beam}(h,z_k) \left\{ \frac{\exp(-2k(d_T - z_k))\Gamma\cos(\theta)}{\pi A_{beam}(h,d_T)} + \beta(\theta) \int_{z_k}^{d_T} \frac{\exp(-2k(d_T - z_k))}{A_{beam}(h,z)} dz \right\} \quad (1)$$

$$F_2(x,y,k,\theta) = 0, \quad (2)$$

$$F_2(x,y,k,\theta) = F_1(x,y,z_k) A_{beam}(h,z_k) \beta(\theta) \int_{z_k}^{z_k + \Delta_k} \frac{\exp(-2k(z - z_k))}{A_{beam}(h,z)} dz \quad (3)$$

where
$A_{beam}(h,z)$=area of the beam at depth z when the imaging sensor is at altitude h.

6. The method of claim 3 wherein the variance is equal to the mean in step (3) and wherein the mean intensity function $F_3$ of step (3) at depth z is determined by equation (1) when the intensity of radiation from a region which is the projection of the (i,j)th pixel on the focal plane of the camera means, and equation (2) where the radiance does not vary significantly over the projected area of a pixel:

$$F_3(i,j,k,\theta) = \int_{\mathcal{A}_{ij}} F_2(x,y,k,\theta) dx dy. \quad (1)$$

$$F_3(i,j,k,\theta) = \frac{A_{pixel}}{f^2} \left[ h + \frac{z}{n} \right]^2 F_2(x_{ij}, y_{ij}, k, \pi) \quad (2)$$

where
f=focal length of the camera means;
n=reflective index of water;
$A_{pixel}$=area of a pixel on the focal plane of the camera; and
$X_{ij}$ and $Y_{ij}$=points within the projection of the $ij$th pixel.

7. The method of claim 3 wherein the variance is equal to the mean in step (4) and the man power $P_4$ of step (4) imaged on a pixel on the focal plane is determined by the equation:

$$F_4(i,j,k) = \Omega T_{in} T \exp(-kz_k) F_3(i,j,k,\pi) \quad (1)$$

where
$T_{in}$=transmission of the optics of the camera means;
T=transmission of the air/water interface;
$\exp(-kz_k)$=attenuation of the beam energy by the water; and $\Omega$=solid angle of the entrance aperture of the camera means as seen from the point $(X_{ij}, Y_{ij}, z_k)$.

8. The method of claim 7 wherein:

$$\Omega = \frac{\pi D^2}{4n^2 \left( h + \frac{z}{n} \right)^2},$$

where
D=diameter of the entrance aperture of the camera means.

9. The method of claim 3 wherein the variance is equal to the mean in step (5) and wherein the mean power $P_5$ of step (5) is determined by the equation:

$$Y = \frac{\lambda}{hc} \frac{I_{sun} T_{in} \Gamma_{water} A_{pixel}}{4 f\#^2} (\tau_{gate} FWHM),$$

where
$\lambda$=wavelength of the pulsed light source;
h=Planck's constant;
c=speed of light in a vacuum;
$I_{sum}$=solar irradiance at the water surface;
$T_{in}$=incoming transmittance;
$\Gamma_{water}$=diffuse reflection of surface;
$A_{pixel}$=area of a pixel on the focal plane of the camera means;
f#=f number of the camera means;
$\tau_{gate}$=gate width in dimensions of time; and
FWHM is the bandwidth of a filter associated with the camera means.

10. The method of claim 3 wherein the variance is equal to the mean in step (6) and wherein the mean number of photons corresponding to the total energy incident on a pixel on a focal plane is determined by equation (1) when the target is assumed present and the top surface of the target lies within the volume corresponding to the pixel index n, equation (2) when the target is assumed present, and the top surface of the target lies below the volume corresponding to the pixel index n, and equation (3) when the target is assumed not present and the mean number of the photons corresponding to index n under the mth hypothesis is denoted $N_n$:

$$T_{nm} = Y + \frac{\lambda}{hc} \frac{E_o \Psi T_{in} T_{out} T^2 A_{pixel}}{4n^2 f\#^2} \left\{ \frac{\exp(-2kd_T)\Gamma}{A_{beam}(h,d_T)} + \pi\beta(\pi) \int_{z_k}^{d_T} \frac{\exp(-2kz)}{A_{beam}(h,z)} dz \right\} \quad (1)$$

$$T_{n,m} = Y + \frac{\lambda}{hc} \frac{E_o \Psi T_{in} T_{out} T^2 A_{pixel}}{4n^2 f\#^2} \pi\beta(\pi) \int_{z_k}^{z_k + \Delta_k} \frac{\exp(-2kz)}{A_{beam}(h,z)} dz \quad (2)$$

$$N_n = Y + \frac{\lambda}{hc} \; \frac{E_o \Psi T_{in} T_{out} T^2 A_{pixel}}{4n^2 f\#^2} \; \pi\beta(\pi) \int_{z_k}^{z_k + \Delta_k} \frac{\exp(-2kz)}{A_{beam}(h,z)} \, dz \quad (3)$$

where
- $T_{n,m}$ = mean number of photons corresponding to index n under the mth hypothesis;
- $\lambda$ = wavelength of the pulsed light source;
- h = Planck's constant;
- c = speed of light in a vacuum;
- $T_{in}$ = incoming transmittance;
- $A_{pixel}$ = area of a pixel on the focal plane of the camera means;
- f# = f number of the camera means;
- $T_{out}$ = outgoing transmittance (pulsed light source to water);
- $E_o$ = energy per pulse;
- $A_{beam}(h,z)$ = area of the beam at depth z when the imaging sensor is at altitude h; and
- $\Psi$ = averaging factor which converts the measured pulse energy to an average energy over the field of view of the gated camera means.

11. In an automatic target detection system for use in an imaging lidar system having pulsed light source transmitter means and gated camera receiver means, the improvement comprising:
   parallel processing computational units for processing hypothetical distributions of photons impinging on the gated camera means using a hypothetical physical and optical model.

12. An apparatus for visually displaying a target viewed by an imaging sensor means, the imaging sensor means including pulsed light source means and gated camera means and wherein the imaging sensor means is positioned on an airborne platform and images targets under water including:
   a) means for calculating the hypothetical distributions of the number of photons impinging on the gated camera means using a hypothetical physical and optical model;
   b) means for obtaining actual target data from targets imaged underwater by the imaging sensor means;
   c) means for processing said actual target data;
   d) means for delivering said actual target data to an automatic target detection system;
   e) comparator means for employing said calculated hypothetical distributions in said automatic target detection system by a comparison of said calculated hypothetical distributions with said processed actual target data to thereby improve in the detection of a target viewed by the imaging sensor means; and
   f) visual display means for visually displaying a target viewed by the imaging sensor means based on the improvement in target detection obtained from said comparator means.

13. The apparatus of claim 9 including multiple processing units for parallel processing and including:
   means for calculating said hypothetical distributions in at least some of said multiple processing units.

* * * * *